US011438820B2

(12) United States Patent
Chaponniere et al.

(10) Patent No.: US 11,438,820 B2
(45) Date of Patent: Sep. 6, 2022

(54) HANDOVER DETERMINATION BETWEEN RELAYS

(71) Applicant: QUALCOMM Incorporated, San Diego, CA (US)

(72) Inventors: Lenaig Genevieve Chaponniere, La Jolla, CA (US); Haris Zisimopoulos, London (GB); Karl Georg Hampel, Hoboken, NJ (US); Sebastian Speicher, Wallisellen (CH); Hong Cheng, Basking Ridge, NJ (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/020,440

(22) Filed: Sep. 14, 2020

(65) Prior Publication Data
US 2021/0084559 A1    Mar. 18, 2021

Related U.S. Application Data

(60) Provisional application No. 62/901,237, filed on Sep. 16, 2019.

(51) Int. Cl.
*H04W 36/30*    (2009.01)
*H04W 36/22*    (2009.01)
(Continued)

(52) U.S. Cl.
CPC .............. *H04W 36/30* (2013.01); *H04B 7/15* (2013.01); *H04W 36/08* (2013.01); *H04W 36/22* (2013.01); *H04W 36/32* (2013.01)

(58) Field of Classification Search
CPC ............... H04W 84/047; H04W 36/08; H04W 36/0016; H04W 36/0055; H04W 36/38;
(Continued)

(56) References Cited

U.S. PATENT DOCUMENTS

2008/0219275 A1*   9/2008   Boariu .................. H04W 8/005
                                                                    370/400
2009/0088164 A1    4/2009   Shen et al.
(Continued)

FOREIGN PATENT DOCUMENTS

GB         2426665 A    11/2006

OTHER PUBLICATIONS

International Search Report and Written Opinion—PCT/US2020/050906—ISA/EPO—dated Oct. 30, 2020.
(Continued)

*Primary Examiner* — Allahyar Kasraian
(74) *Attorney, Agent, or Firm* — Muncy, Geissler, Olds and Lowe

(57) ABSTRACT

Disclosed are techniques for wireless communication that over come problems associated with conventional approaches including load balancing and handover efficiency issues. For example, in one aspect a wireless communication technique takes into account the load of a relay before a UE is switched from one relay to another. In another example, a wireless communication technique ensures that UEs are handed over to relays that will be able to serve the UE as the mobile relay continues to follow its expected path (such as streets or tracks), which may be known or determined.

30 Claims, 18 Drawing Sheets

(51) Int. Cl.
*H04W 36/08* (2009.01)
*H04W 36/32* (2009.01)
*H04B 7/15* (2006.01)

(58) Field of Classification Search
CPC . H04W 36/0033; H04W 36/06; H04W 36/30; H04W 36/22; H04W 36/32; H04W 36/14; H04W 36/0011; H04W 36/12; H04W 40/22; H04B 7/15; H04B 7/155; H04B 7/15507; H04B 17/318
See application file for complete search history.

(56) References Cited

U.S. PATENT DOCUMENTS

| | | | |
|---|---|---|---|
| 2009/0175214 A1 | 7/2009 | Sfar et al. | |
| 2012/0051349 A1* | 3/2012 | Teyeb | H04W 36/02 370/338 |
| 2013/0039185 A1* | 2/2013 | Teyeb | H04W 28/06 370/235 |
| 2013/0115955 A1* | 5/2013 | Deng | H04W 36/0061 455/437 |
| 2015/0133129 A1* | 5/2015 | Chiang | H04W 16/10 455/447 |
| 2018/0076878 A1* | 3/2018 | Ryu | H04W 72/048 |
| 2018/0109990 A1* | 4/2018 | Martin | H04W 40/12 |
| 2018/0343598 A1* | 11/2018 | Xu | H04W 36/0055 |
| 2021/0168692 A1* | 6/2021 | Otaka | H04B 17/318 |
| 2021/0204348 A1* | 7/2021 | Chen | H04W 36/0055 |

OTHER PUBLICATIONS

ZTE: "TP for Relay to Relay Path Switch in feD2D", 3GPP Draft, 3GPP TSG-RAN WG3 Meeting #96, R3-171655_TP for Relay to Relay Path Switch, 3rd Generation Partnership Project (3GPP), Mobile Competence Centre, 650, Route Des Lucioles, F-06921 Sophia-Antipolis Cedex, France, vol. RAN WG3. No. Hangzhou, China, May 15, 2017-May 19, 2017, May 14, 2017 (May 14, 2017). XP051276441, 10 Pages, Retrieved from the Internet:URL:http://www.3gpp.org/ftp/Meetings_3GPP_SYNC/RAN/Docs/ [retrieved on May 14, 2017] pp. 8,9.

* cited by examiner

HANDOVER DETERMINATION BETWEEN RELAYS

CROSS-REFERENCE TO RELATED APPLICATIONS

The present application for patent claims the benefit of U.S. Provisional Application No. 62/901,237, entitled "UE HANDOVER DETERMINATION," filed Sep. 16, 2019, assigned to the assignee hereof, and expressly incorporated herein by reference in its entirety.

INTRODUCTION

Various aspects described herein generally relate to wireless communication systems, and more particularly, a user equipment (UE) handover determination in a wireless communication system.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (such as Long Term Evolution (UE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard, also referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor, for example. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In existing macro networks, such as traditional 4G/5G deployments including evolved NodeB (eNB), an NR general Node B (gNodeB, gNB), the eNBs/gNBs are fixed, consequently the list of neighbors eNBs/gNBs that a UE is expected to see (and potentially be handed over to) when camped on a particular eNB/gNB is known and fixed. As a result, in conventional 4G networks no explicit neighbor list is provided to the UE in idle mode.

In addition, conventional approaches suffer from load balancing and handover efficiency issues. For example, in existing "macro" networks, each cell served by an eNB/gNB is dimensioned according to the number of UEs it is expected to serve, based on the density of the area within its coverage in terms of population. However in the FleetNet system, the number of users served by a relay, and the number of relays served by a donor gNB, cannot be predicted since the relays keep moving. Thus, there is a need to take into account the load of a relay before a UE is switched from one relay to another. In another example, relays will increase the number of devices a given base station has to serve. Furthermore, vehicle-based relays will also lead to an increase in the number of handovers that base stations need to handle, which in turn will increase the amount of handover related signaling. To avoid increasing the amount of handover signaling even further, it is important to ensure that UEs are handed over to relays that will be able to serve the UE as the mobile relay continues to follow its expected path (such as streets or tracks).

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

In accordance with at least one aspect, a method for wireless communication includes: connecting a user equipment (UE) to a first relay, the first relay connected to a network node; receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node; determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; and connecting the UE to the second relay when the handover decision is determined to be positive.

In accordance with at least one aspect, a method of wireless communication includes: connecting a user equipment (UE) to a first relay, the first relay connected to a network node; receiving relay information by the UE, the relay information comprising signal strength information of the first relay, load information of the first relay, signal strength information of a second relay, load information of the second relay, wherein the second relay is connected to the network node; determining, by the UE, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; transmitting, by the UE, a connection reconfiguration request when the handover decision is determined to be positive; and connecting the UE to the second relay when the handover decision is determined to be positive.

In accordance with at least one aspect, a method of wireless communication includes: connecting a user equipment (UE) to a first relay, the first relay connected to a network node; receiving relay information by the UE, the relay information comprising signal strength information of the first relay, load information of the first relay, signal strength information of a second relay, load information of the second relay, wherein the second relay is connected to the network node; determining, by the UE, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; transmitting, by the UE, a connection request to the second relay when the handover decision is determined to be positive; connecting the UE to the second relay when a setup response is received; and disconnecting the UE from the first relay after connecting to the second relay.

In accordance with at least one aspect, a method of wireless communication includes: connecting a user equipment (UE) to a first relay, the first relay connected to a network node; receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node; determining, by the network node, whether a handover preparation decision is positive or negative, wherein the handover preparation decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; transmitting a connection reconfiguration to the UE when the handover preparation decision is determined to be positive; and connecting the UE to the second relay when the UE initiates a handover based on conditions specified in the connection reconfiguration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
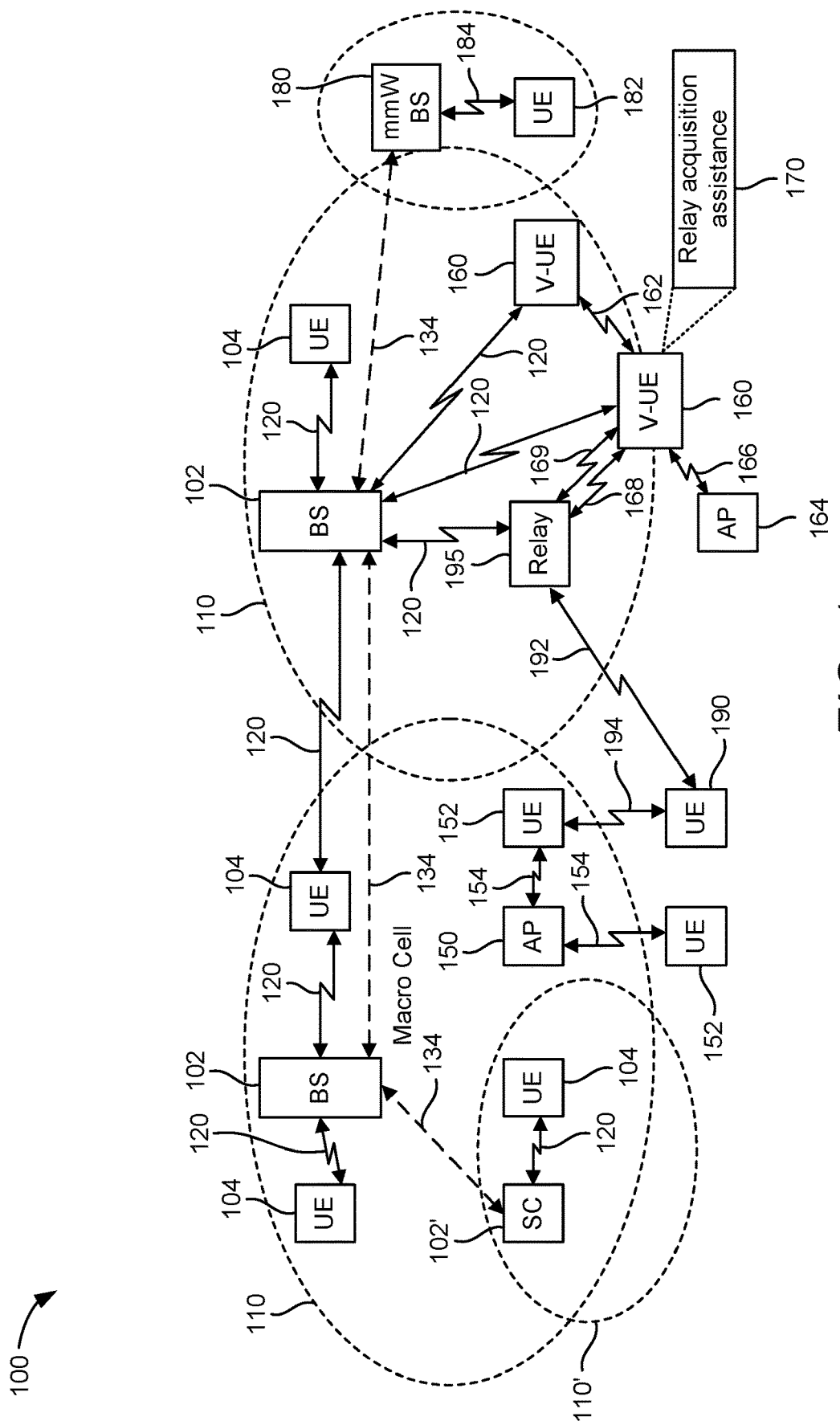
FIG. 1 illustrates a wireless communications system in accordance with one or more aspects of the disclosure.

Disclosed are techniques for wireless communication that over come problems associated with conventional approaches including load balancing and handover efficiency issues. For example, in one aspect wireless communication technique takes into account the load of a donor gNB before a relay decides to reselect from one donor gNB to another. In another example, a wireless communication technique ensures that relays are handed over to base stations that will be able to serve the relay as the mobile relay continues to follow its expected path (such as streets or tracks).

These and other aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (such as an application specific integrated circuit (ASIC)), by program instructions being executed by one or more processors, or by a combination of both. Additionally, these sequences of actions described herein can be considered to be incorporated entirely within any form of non-transitory computer-readable medium having stored thereon a corresponding set of computer instructions that upon execution would cause an associated processor to perform the functionality described herein. Thus, the various aspects described herein may be incorporated in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "UE," "vehicle UE" (V-UE), and "base station" are not intended to be specific or otherwise limited to any particular radio access technology (RAT), unless otherwise noted. In general, such UEs may be any wireless communication device (such as a vehicle onboard computer, a vehicle navigation device, a mobile phone, a router, a tablet computer, a laptop computer, a tracking device, an Internet of Things (IoT) device, etc.) used by a user to communicate over a wireless communications network. A UE may be mobile or may (such as at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. A V-UE may be any in-vehicle wireless communication device, such as a navigation system, a warning system, a heads-up display (HUD), etc. Alternatively, a V-UE may be a portable wireless communication device (such as a cell phone, tablet computer, etc.) that belongs to the driver of the vehicle or a passenger in the vehicle. The term "V-UE" may refer to the in-vehicle wireless communication device or the vehicle itself, depending on the context. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (such as based on IEEE 802.11, etc.) and so on.

As used herein, the terms "load information", "load threshold" "signal strength information", "strength threshold", "velocity", and "velocity threshold" are not intended to be specific or otherwise limited to any particular type of information or threshold related to the load on a relay or UE, the signal strength of the relay or UE signal, the relative speed of the relay or UE, unless otherwise noted. For example, load information and load thresholds may be used for load balancing between relays such as described in IEEE 802.16. In another example, velocity of a UE may be a relative velocity of the UE compared to the relay that may be used to predict when the UE may exit or enter the relay's coverage area. The thresholds may be dynamic, static, and specific to a particular UE or relay and may be set or calculated by a network administrator or the network equipment itself.

A base station may operate according to one of several RATs in communication with UEs depending on the network in which it is deployed, and may be alternatively referred to as an access point (AP), a network node, a NodeB, an evolved NodeB (eNB), a general Node B (gNodeB, gNB), etc. In addition, in some systems a base station may provide purely edge node signaling functions while in other systems it may provide additional control and/or network management functions.

UEs can be any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (such as a reverse traffic channel, a reverse control channel, an access channel, etc.). A communication link through which the RAN can send signals to UEs is called a downlink or forward link channel (such as a paging channel, a control channel, a broadcast channel, a forward traffic channel, etc.). As used herein the term traffic channel (TCH) can refer to either an uplink/reverse or downlink/forward traffic channel.

FIG. 1 illustrates a wireless communications system 100 according to one or more aspects. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs) where the wireless communications system 100 corresponds to an LTE network, gNodeBs (gNBs) where the wireless communications system 100 corresponds to a 5G network, and/or a combination thereof, and the small cells may include femtocells, picocells, microcells, etc.

The base stations 102 may collectively form a RAN and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, RAN sharing, multimedia broadcast multicast service (MBMS), evolved multimedia broadcast multicast services (eMBMS), 5G multicast broadcast services (MBS) subscriber and equipment trace, RAN information management (RIM), paging, positioning, and delivery of warning messages. The base stations 102 may communicate with each other directly or indirectly (such as through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (such as three), or sectors, each cell corresponding to a single antenna or array of antennas of a base station 102.

The term "cell" refers to a logical communication entity used for communication with a base station 102 (such as over a carrier frequency), and may be associated with an identifier for distinguishing neighboring cells (such as a physical cell ID (PCI), an enhanced cell identifier (E-CID), a virtual cell identifier (VCID), etc.) operating via the same or a different carrier frequency. In some examples, a carrier frequency may support multiple cells, and different cells may be configured according to different protocol types (such as machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (such as a sector) over which the logical entity operates. As used herein, the term "cell" or "sector" may correspond to one of a plurality of cells of a base station 102, or to the base station 102 itself, depending on the context.

While neighboring macro cell geographic coverage areas 110 may partially overlap (such as in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs) and/or Home gNodeBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (such as more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (such as 5 gigahertz (GHz)). When communicating in an unlicensed frequency spectrum, the UEs 152 (WLAN STAs) and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (such as through which UE 190 may indirectly obtain cellular connectivity) and a D2D P2P link 194 with 'UE 152, a WLAN STA, connected to the WLAN AP 150 (through which UE 190 may indirectly obtain WLAN-based Internet connectivity). In an example, the D2D P2P links 192-194 may be supported with any well-known D2D RAT, such as LTE Direct (LTE-D), WiFi Direct (WiFi-D), Bluetooth, and so on.

Leveraging the increased data rates and decreased latency of 5G, among other things, Vehicle-to-Everything (V2X) communication technologies are being implemented to support Intelligent Transportation Systems (ITS) applications, such as wireless communications between vehicles (Vehicle-to-Vehicle (V2V)), between vehicles and the roadside infrastructure (Vehicle-to-Infrastructure (V2I)), and between vehicles and pedestrians (Vehicle-to-Pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide.

Still referring to FIG. 1, the wireless communications system 100 may include multiple V-UEs 160 that may communicate with base stations 102 over communication links 120 (such as using the Uu interface). V-UEs 160 may also communicate directly with each other over a wireless unicast sidelink 162, with a roadside access point 164 over a sidelink 166, or with relay 195 over a Uu interface 169 and/or a sidelink 168 using P2P/D2D protocols (such as "PC5," an LTE V2X D2D interface) or ProSe direct communications. Sidelink communication may be used for D2D media-sharing, V2V communication, V2X communication (such as cellular V2X (cV2X) communication, enhanced V2X (eV2X) communication, etc.), emergency rescue applications, etc. One or more of a group of V-UEs 160 utilizing D2D communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via D2D communications may utilize a one-to-many (1:M) system in which each V-UE 160 transmits to every other V-UE 160 in the group. In some cases, a base station 102 facilitates the scheduling of resources for D2D communications. In other cases, D2D communications are carried out between V-UEs 160 without the involvement of a base station 102.

In an aspect, the V-UEs 160, and any other UE illustrated in FIG. 1, may have relay acquisition assistance function also referred to herein as relay acquisition assistance module 170. The relay acquisition assistance module 170 may be a hardware, software, or firmware component that, when executed, causes the V-UE 160 to perform the operations described herein. For example, the acquisition assistance module 170 may be a software module stored in a memory of the V-UE 160 and executable by a processor of the V-UE 160. As another example, the relay acquisition assistance module 170 may be a hardware circuit (such as an ASIC, a field programmable gate array (FPGA), etc.) within the V-UE 160.

In an aspect, the wireless sidelinks 162, 166, 168 may operate over a communication medium of interest, which may be shared with other communications between other vehicles and/or infrastructure access points, as well as other RATs. A "medium" may be composed of one or more frequency, time, and/or space communication resources (such as encompassing one or more channels across one or more carriers) associated with communication between one or more transmitter/receiver pairs.

In an aspect, the wireless sidelinks 162, 166, 168 may be cV2X links. A first generation of cV2X has been standardized in LTE, and the next generation is expected to be defined in 5G (also referred to as "New Radio" (NR) or "5G NR"). cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the wireless sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (such as by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of code division multiple access (CDMA) systems, time division multiple access (TDMA) systems, frequency division multiple access (FDMA) systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more P-UEs 104 are referred to as V2P communications. The V2V communications between V-UEs 160 may include, for example, information about the position, velocity, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a P-UE 104 may include information about, for example, the position, velocity, acceleration, and heading of the V-UE 160 and the position, velocity (such as where the P-UE 104 is a bicycle), and heading of the P-UE 104.

Figure 2A:
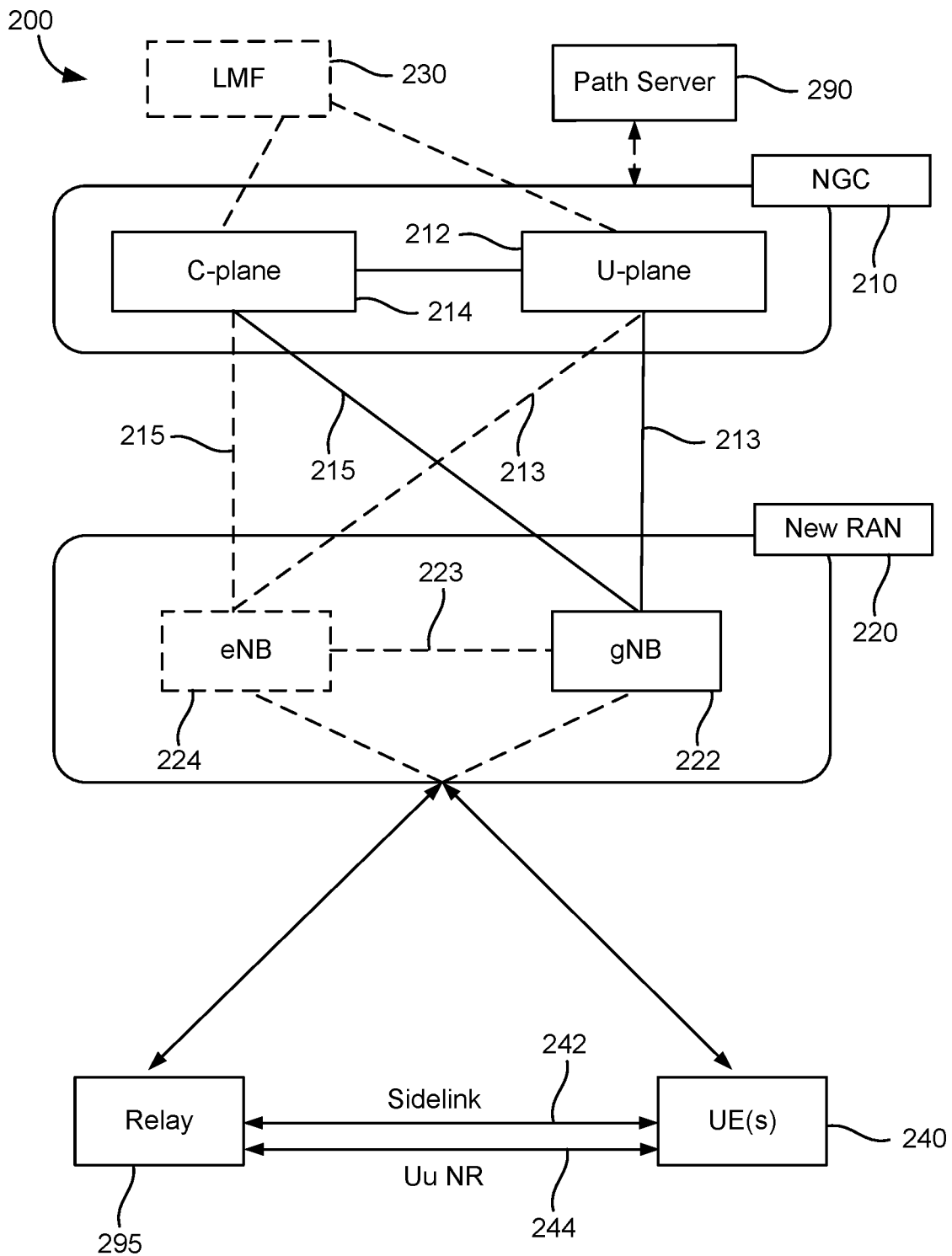
FIGS. 2A and 2B illustrate example wireless network structures, according to various aspects.

FIG. 2A illustrates an example wireless network 200 according to one or more aspects. For example, a Next Generation Core (NGC) 210 can be viewed functionally as control plane functions 214 (such as UE registration, authentication, network access, gateway selection, etc.) and user plane functions 212, (such as UE gateway function, access to data networks, IP routing, etc.) that operate cooperatively to form the core network. User plane interface (NG-U) 213 and control plane interface (NG-C) 215 connect one or more gNBs 222 to the NGC 210 and specifically to the control plane functions 214 and user plane functions 212. In an additional configuration, one or more eNBs 224 may also be connected to the NGC 210 via NG-C 215 to the control plane functions 214 and NG-U 213 to user plane functions 212. Further, eNB(s) 224 may directly communicate with gNB(s) 222 via a backhaul connection 223. Accordingly, in some configurations, the New RAN 220 may only have one or more gNBs 222, while other configurations include one or more of both eNBs 224 and gNBs 222. Either gNB(s) 222 or eNB(s) 224 may communicate with one or more UEs 240 (such as any of the UEs depicted in FIG. 1, such as UEs 104, UE 152, UE 160, UE 182, UE 190, etc.). Additionally, a relay 295 may communicate with EPC 260 via eNB(s) 224 or gNB(s) 222 configured as donor base stations, discussed in greater detail in the following. In an aspect, UE 240 may communicate with NGC 210 directly via eNB(s) 224 or gNB(s) 222. Alternatively or in addition to UE 240 may communicate to the network 200, via relay 295. The UE 240 may communicate to the relay 295 over a wireless unicast sidelink 242, which may correspond to wireless unicast sidelink 162 in FIG. 1 and/or may communicate over a Uu NR link 244, which is discussed in greater detail in the following disclosure.

The network 200 may include a path server 290 in communication with the NGC 210 to obtain relay path information from relay 295 and provide a relay cell list to assist the UE 240 in searching for and connecting to relay 295. The path server 290 can be implemented as single server or may be a plurality of structurally separate servers. Although FIG. 2A illustrates the path server 290 as separate from the NGC 210 and the New RAN 220, in some aspects, it may instead be integrated into one or more components of the NGC 210 or the New RAN 220. The functionality of the relay 295 and path server 290 will be discussed in greater detail starting in relation to FIG. 6A and in the following disclosure.

Another optional aspect may include a location management function (LMF) 230 in communication with the NGC 210 to provide location assistance for UEs 240. The LMF 230 determines, using information from the UE 240 and/or the New RAN 220, the current location of the UE 240 and provides it on request. The LMF 230 can be implemented as a plurality of structurally separate servers, or alternately may each correspond to a single server. Although FIG. 2A illustrates the LMF 230 as separate from the NGC 210 and the New RAN 220, it may instead be integrated into one or more components of the NGC 210 or the New RAN 220.

Figure 2B:
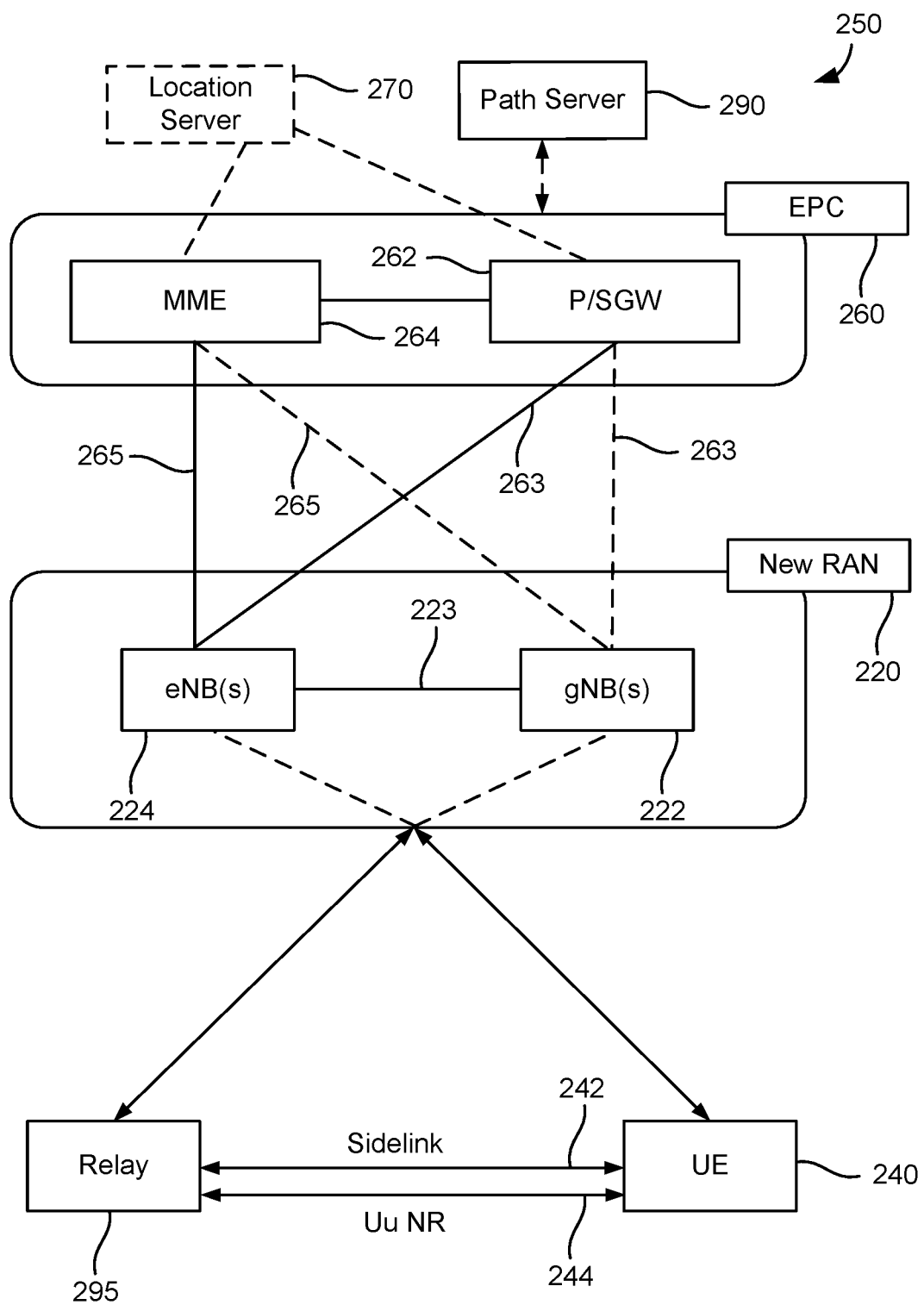

FIG. 2B illustrates an example wireless network structure 250 according to one or more aspects. For example, Evolved Packet Core (EPC) 260 can be viewed functionally as control plane functions, i.e., Mobility Management Entity (MME) 264, and user plane functions, i.e., Packet Data Network Gateway/Serving Gateway (P/SGW) 262, which operate cooperatively to form the core network. S1 control plane interface (S1-MME) 265 and S1 user plane interface (S1-U) 263 connect one or more eNBs 224 to the EPC 260, and specifically to MME 264 and P/SGW 262, respectively.

In an additional configuration, one or more gNBs 222 may also be connected to the EPC 260 via S1-MME 265 to MME 264 and S1-U 263 to P/SGW 262. Further, eNB(s) 224 may directly communicate with one or more gNBs 222 via the backhaul connection 223, with or without gNB direct connectivity to the EPC 260. Accordingly, in some configurations, the New RAN 220 may only have gNB(s) 222, while other configurations include both eNB(s) 224 and gNB(s) 222. Either gNB(s) 222 or eNB(s) 224 may communicate with one or more UEs 240 (such as any of the UEs depicted in FIG. 1, such as UEs 104, UE 182, UE 190, etc.). Additionally, a relay 295 may communicate with EPC 260 via eNB(s) 224 or gNB(s) 222 configured as donor base stations, discussed in greater detail in the following. In an aspect, UE 240 may communicate with EPC 260 directly via eNB(s) 224 or gNB(s) 222. Alternatively or in addition to UE 240 may communicate to the network 200, via relay 295. The UE 240 may communicate to the relay 295 over a wireless unicast sidelink 242, which may correspond to wireless unicast sidelink 162 in FIG. 1 and/or may communicate over a Uu NR link 244, which is discussed in greater detail in the following disclosure.

The network 250 may include a path server 290 in communication with the EPC 260 to obtain relay path information from relay 295 and provide a relay cell list to assist the UE 240 in searching for and connecting to relay 295. The path server 290 can be implemented as single server or may be a plurality of structurally separate servers. Although FIG. 2A illustrates the path server 290 as separate from the EPC 25 and the New RAN 220, in some aspects, it may instead be integrated into one or more components of the EPC 260 or the New RAN 220. The functionality of the relay 295 and path server 290 will be discussed in greater detail starting in relation to FIG. 6A and the following disclosure.

Another optional aspect may include a location server 270 that may be in communication with the EPC 260 to provide location assistance for UE(s) 240. In an aspect, the location server 270 may be an Evolved Serving Mobile Location Center (E-SMLC), a Secure User Plane Location (SUPL) Location Platform (SLP), a Gateway Mobile Location Center (GMLC), or the like. The location server 270 can be implemented as a plurality of structurally separate servers, or alternately may each correspond to a single server. The location server 270 can be configured to support one or more location services for UE(s) 240 that can connect to the location server 270 via the core network, EPC 260, and/or via the Internet (not illustrated).

Figure 3:
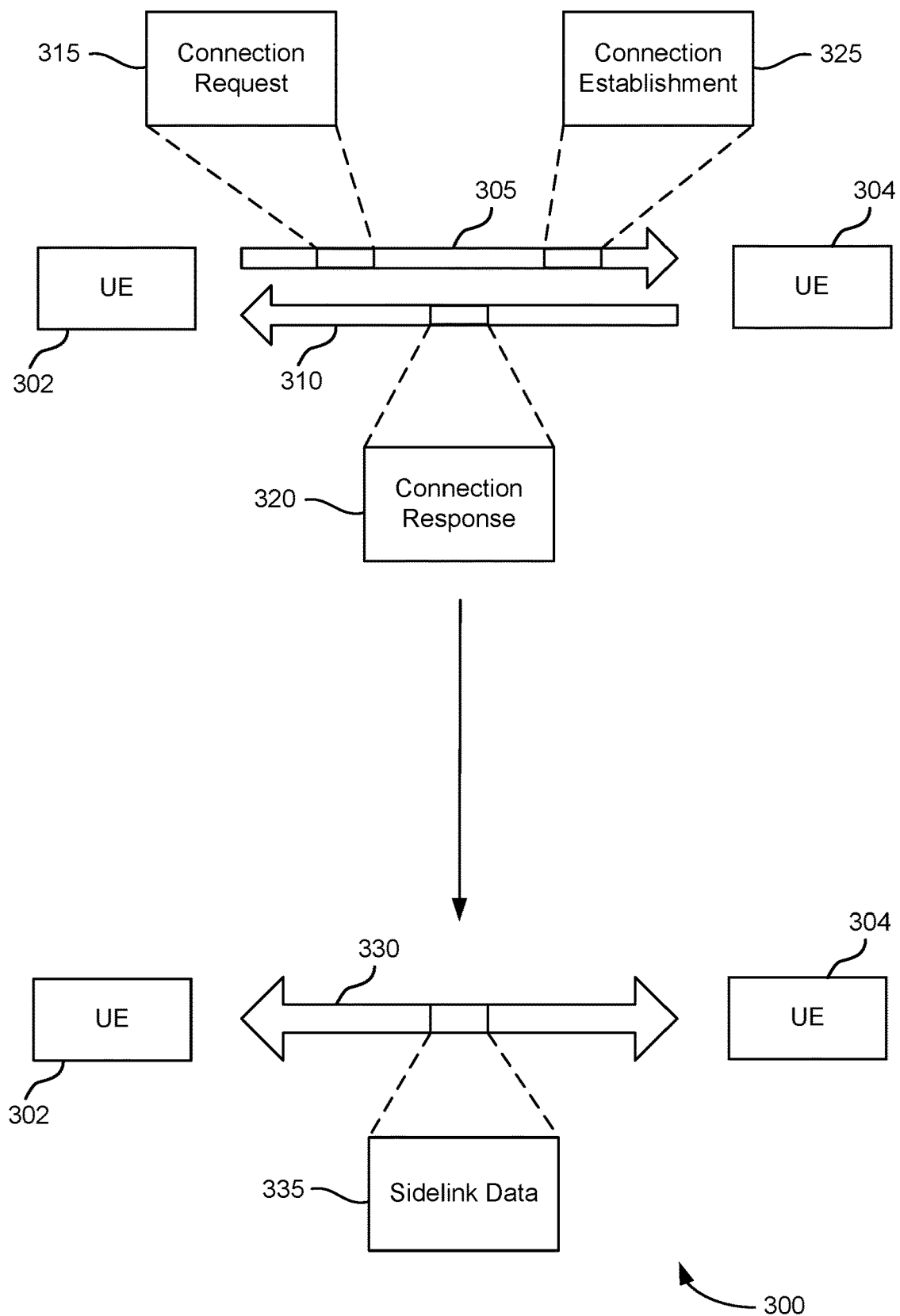
FIG. 3 illustrates an example of a wireless communications system that supports unicast sidelink establishment in accordance with aspects of the disclosure.

FIG. 3 illustrates an example wireless communications system 300 that supports unicast sidelink establishment in accordance with aspects of the disclosure. In some examples, wireless communications system 300 may implement aspects of wireless communications networks 100, 200, and 250. Wireless communications system 300 may include a first UE 302 and a second UE 304, which may be examples of any of the UEs depicted in FIG. 1, such as UEs 104, UE 152, UEs 160, UE 182, UE 190, etc., or the UEs 240 depicted in FIGS. 2A and 2B. A UE 302 may attempt to establish a unicast connection over a sidelink with UE 304, which may be a V2X communication link between UE 302 and UE 304. Additionally or alternatively, the unicast connection over the sidelink may generally be used for sidelink communications between any two UEs. Thus, the established sidelink connection may correspond to wireless sidelinks 162, 166, and/or 168 in FIG. 1 and/or wireless sidelink 242 in FIGS. 2A and 2B. It will be appreciate that relays disclosed herein (such as relay 195, 295, etc.) may be consider as UEs generally and are configured as a relay when they provide an operative link to provide communications from a donor base station or upstream relay to a UE or downstream relay. Accordingly, aspects of the sidelink (such as PC5) functionality described herein for the UEs are also applicable to the relays.

For establishing the unicast connection, access stratum (AS) (a functional layer in the UMTS and LTE protocol stacks between the RAN and the UE that is responsible for transporting data over wireless links and managing radio resources, also referred to as "Layer 2") parameters may be configured and negotiated between UE 302 and UE 304. For example, a transmission and reception capability matching may be negotiated between UE 302 and UE 304. Each UE may have different capabilities (such as transmission and reception capabilities, 64QAM, transmission diversity, carrier aggregation (CA) capabilities, supported communications frequency band(s), etc.). In some cases, different services may be supported at the upper layers of corresponding protocol stacks for UE 302 and UE 304. Additionally, a security association may be established between UE 302 and UE 304 for the unicast connection. Unicast traffic may benefit from security protection at a link level (such as Integrity Protection). Security requirements may differ for different wireless communications systems. For example, V2X and Uu interfaces may have different security requirements (such as Uu security does not include confidentiality protection). Additionally, Internet protocol (IP) configurations (such as IP versions, addresses, etc.) may be negotiated for the unicast connection between UE 302 and UE 304.

In some cases, UE 304 may create a service announcement (such as a service capability message) to transmit over a cellular network (such as cV2X) to assist the unicast connection establishment. Conventionally, UE 302 may identify and locate candidates for unicast communications based on a basic service message (BSM) broadcasted unencrypted by nearby UEs (such as UE 304). The BSM may include location information, security and identity information, and vehicle information (such as velocity, maneuver, size, etc.) for the corresponding UE. However, for different wireless communications systems (such as D2D or V2X communications), a discovery channel may not be configured so that UE 302 is able to detect the BSM(s). Accordingly, the service announcement transmitted by UE 304 and other nearby UEs (such as a discovery signal) may be an upper layer signal and broadcasted (such as in a NR sidelink broadcast). In some cases, UE 304 may include one or more parameters for itself in the service announcement, including connection parameters and/or capabilities it possesses. UE 302 may then monitor for and receive the broadcasted service announcement to identify potential UEs for corresponding unicast connections. In some cases, UE 302 may identify the potential UEs based on the capabilities each UE indicates in their respective service announcements.

The service announcement may include information to assist UE 302 (such as or any initiating UE) to identify the UE transmitting the service announcement. For example, the service announcement may include channel information where direct communication requests may be sent. In some cases, the channel information may be specific to RAT (such as LTE or NR) and may include a resource pool that UE 302 transmits the communication request in. Additionally, the service announcement may include a specific destination address for the UE (such as a Layer 2 (L2) destination address) if the destination address is different from the current address (such as the address of the streaming provider or UE transmitting the service announcement). The service announcement may also include a network or transport layer for UE 302 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (such as PC5 signaling) carries a protocol (such as a real-time transport protocol (RTP)) directly or gives a locally-generated random protocol. Additionally, the service announcement may include a type of protocol for credential establishment and QoS-related parameters.

After identifying a potential unicast connection target (such as UE 304), UE 302 (such as the initiating UE) may transmit a connection request 315 to the identified target. In some cases, the connection request 315 may be a first RRC message transmitted by UE 302 to request a unicast connection with UE 304 (such as an RRCDirectConnectionSetupRequest message). For example, the unicast connection may utilize the PC5 interface for the unicast link, and the connection request 315 may be an RRC connection setup request message. Additionally, UE 302 may use a sidelink signaling radio bearer 305 to transport the connection request 315.

After receiving the connection request 315, UE 304 may determine whether to accept or reject the connection request 315. UE 304 may base this determination on a transmission/reception capability, an ability to accommodate the unicast connection over the sidelink, a particular service indicated for the unicast connection, the contents to be transmitted over the unicast connection, or a combination thereof. For example, if UE 302 wants to use a first RAT to transmit or receive data, but UE 304 does not support the first RAT, then UE 304 may reject the connection request 315. Additionally or alternatively, UE 304 may reject the connection request 315 based on being unable to accommodate the unicast connection over the sidelink due to a limited radio resource, a scheduling issue, etc. Accordingly, UE 304 may transmit an indication of whether the request is accepted or rejected in a connection response 320. Similar to UE 302 and the connection request 315, UE 304 may use a sidelink signaling radio bearer 310 to transport the connection response 320. Additionally, the connection response 320 may be a second RRC message transmitted by UE 304 in response to the connection request 315 (such as an RRCDirectConnectionResponse message).

In some cases, sidelink signaling radio bearers 305 and 310 may be a same sidelink radio signal bearer or may be separate sidelink signaling radio bearers. Accordingly, a radio link control (RLC) layer acknowledged mode (AM) may be used for sidelink signaling radio bearers 305 and 310. A UE that supports the unicast connection may listen on a logical channel associated with the sidelink signaling radio bearers. In some cases, the AS layer (i.e., Layer 2) may pass information directly through RRC signaling (such as control plane) instead of a V2X layer (such as data plane).

If the connection response 320 indicates that UE 304 accepted the connection request 315, UE 302 may then transmit a connection establishment 325 message on the sidelink signaling radio bearer 305 to indicate that the unicast connection setup is complete. In some cases, the connection establishment 325 may be a third RRC message (such as an RRCDirectConnectionSetupComplete message). Each of the connection request 315, the connection response 320, and the connection establishment 325 may use a basic capability when being transported from a UE to the other UE to enable each UE to be able to receive and decode a corresponding transmission (such as RRC message).

Additionally, identifiers may be used for each of the connection request 315, the connection response 320, and the connection establishment 325 (such as the RRC signaling). For example, the identifiers may indicate which UE 302/304 is transmitting which message and/or which UE 302/304 the message is intended for. For physical (PHY) channels, the RRC signaling and any subsequent data transmissions may use a same identifier (such as L2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a PHY layer ACK may be used for ensuring the corresponding messages are transmitted and received properly.

One or more information elements may be included in the connection request 315 and/or the connection response 320 for UE 302 and/or UE 304, respectively, to enable negotiation of corresponding AS layer parameters for the unicast connection. For example, UE 302 and/or UE 304 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, UE 302 and/or UE 304 may include RLC parameters when establishing the unicast connection to set an RLC context of the unicast connection. For example, the RLC context may indicate whether an AM (such as a reordering timer (t-reordering) is used) or an unacknowledged mode (UM) is used for the RLC layer of the unicast communications.

Additionally, UE 302 and/or UE 304 may include medium access control (MAC) parameters to set a MAC context for the unicast connection. In some cases, the MAC context may enable resource selection algorithms, a hybrid automatic repeat request (HARQ) feedback scheme (such as ACK or negative ACK (NACK) feedback), parameters for the HARQ feedback scheme, CA, or a combination thereof for the unicast connection. Additionally, UE 302 and/or UE 304 may include PHY layer parameters when establishing the unicast connection to set a PHY layer context for the unicast connection. For example, the PHY layer context may indicate a transmission format (unless transmission profiles are included for each UE) and a radio resource configuration (such as bandwidth part (BWP), numerology, etc.) for the unicast connection. These information elements may be supported for different frequency range configurations (such as frequency range 1 (FR1) for a sub-6 GHz frequency band, typically 450 MHz to 6000 MHz, and frequency range 2 (FR2) for mmW, typically 24250 MHz to 52600 MHz).

In some cases, a security context may also be set for the unicast connection (such as after the connection establishment 325 message is transmitted). Before a security association (such as security context) is established between UE 302 and UE 304, the sidelink signaling radio bearers 305 and 310 may not be protected. After a security association is established, the sidelink signaling radio bearers 305 and 310 may be protected. Accordingly, the security context may enable secure data transmissions over the unicast connection and the sidelink signaling radio bearers 305 and 310. Additionally, IP layer parameters (such as link-local IPv4 or IPv6 addresses) may also be negotiated. In some cases, the IP layer parameters may be negotiated by an upper layer control protocol running after RRC signaling is established (such as the unicast connection is established. As noted above, UE 304 may base its decision on whether to accept or reject the connection request 315 on a particular service indicated for the unicast connection and/or the contents to be transmitted over the unicast connection (such as upper layer information). The particular service and/or contents may be also indicated by an upper layer control protocol running after RRC signaling is established.

After the unicast connection is established, UE 302 and UE 304 may communicate using the unicast connection over a sidelink 330, where sidelink data 335 is transmitted between the two UEs 302 and 304. In some cases, the sidelink data 335 may include RRC messages transmitted between the two UEs 302 and 304. To maintain this unicast connection on sidelink 330, UE 302 and/or UE 304 may transmit a keep alive message (such as RRCDirectLinkAlive message, a fourth RRC message, etc.). In some cases, the keep alive message may be triggered periodically or on-demand (such as event-triggered). Accordingly, the triggering and transmission of the keep alive message may be invoked by UE 302 or by both UE 302 and UE 304. Additionally or alternatively, a MAC control element (CE) (such as defined over sidelink 330) may be used to monitor the status of the unicast connection on sidelink 330 and maintain the connection. When the unicast connection is no longer needed (such as UE 302 travels far enough away from UE 304), either UE 302 and/or UE 304 may start a release procedure to drop the unicast connection over sidelink 330. Accordingly, subsequent RRC messages may not be transmitted between UE 302 and UE 304 on the unicast connection.

Figure 4:
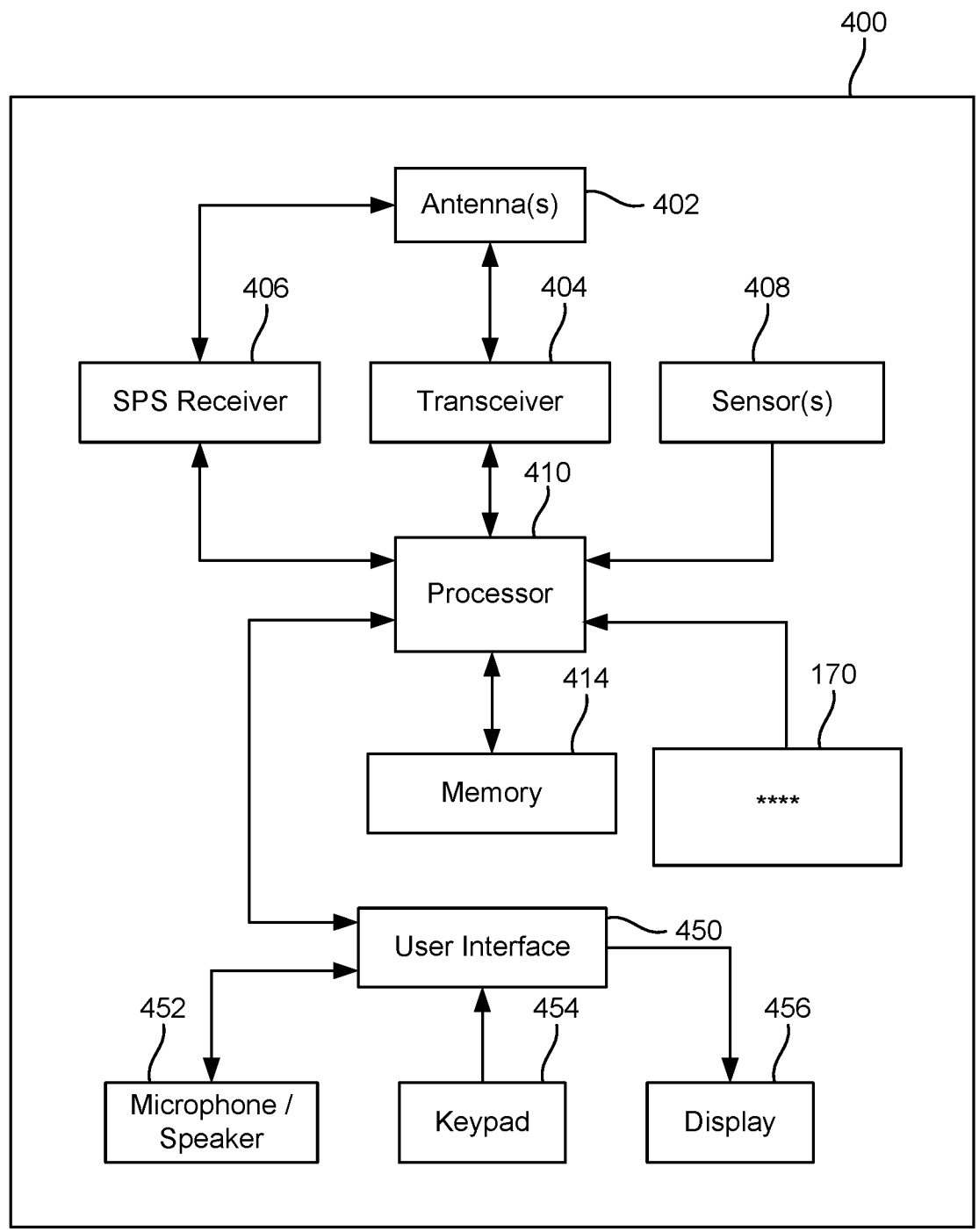
FIG. 4 is a block diagram illustrating various components of an UE according to at least one aspect of the disclosure.

FIG. 4 is a block diagram illustrating various components of an UE 400, according to aspects of the disclosure. In an aspect, the UE 400 may correspond to any of UEs 104, 152, 160, 182, 190 in FIG. 1, UEs 240 in FIGS. 2A and 2B, or UEs 302, 304 in FIG. 3. For the sake of simplicity, the various features and functions illustrated in the block diagram of FIG. 4 are connected together using a common bus that is meant to represent that these various features and functions are operatively coupled together. Those skilled in the art will recognize that other connections, mechanisms, features, functions, or the like, may be provided and adapted as necessary to operatively couple and configure an actual UE. Further, it is also recognized that one or more of the features or functions illustrated in the example of FIG. 4 may be further subdivided, or two or more of the features or functions illustrated in FIG. 4 may be combined.

The UE 400 may include at least one transceiver 404 connected to one or more antennas 402 for communicating with other network nodes, such as other vehicles (such as the one or more other V-UEs 160), relays (such as 195, 295), infrastructure access points (such as the one or more roadside access points 164), P-UEs (such as the one or more P-UEs 104), base stations (such as base stations 102), etc., via at least one designated RAT (such as C-V2X or IEEE 802.11p) over a medium of interest utilized by the unicast sidelinks 162. The transceiver 404 may be variously configured for transmitting and encoding signals (such as messages, indications, information, and so on), and, conversely, for receiving and decoding signals (such as messages, indications, information, pilots, and so on) in accordance with the designated RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (such as a receiver chip or similar circuitry simply providing low-level sniffing).

The UE 400 may also include a satellite positioning service (SPS) receiver 406. The SPS receiver 406 may be connected to the one or more antennas 402 for receiving satellite signals. The SPS receiver 406 may include any suitable hardware and/or software for receiving and processing SPS signals. The SPS receiver 406 requests information and operations as appropriate from the other systems, and performs the calculations necessary to determine the UE's 400 position using measurements obtained by any suitable SPS algorithm.

One or more sensors 408 may be coupled to a processor 410 to provide information related to the state and/or environment of the UE 400, such as velocity, heading (such as compass heading), headlight status, gas mileage, etc. By way of example, the one or more sensors 408 may include a speedometer, a tachometer, an accelerometer (such as a microelectromechanical systems (MEMS) device), a gyroscope, a geomagnetic sensor (such as a compass), an altimeter (such as a barometric pressure altimeter), etc.

The processor 410 may include one or more microprocessors, microcontrollers, ASICs, and/or digital signal processors that provide processing functions, as well as other calculation and control functionality. The processor 410 may include any form of logic suitable for performing, or causing the components of the UE 400 to perform, at least the techniques provided herein. In some aspects, the processor 410 may include a modem processor to manage at least in part to perform functions at the PHY layer and MAC layer and an application processor configured at least in part to perform functions at the application layer.

The processor 410 may also be coupled to a memory 414 for storing data and software instructions for executing programmed functionality within the UE 400. The memory 414 may be on-board the processor 410 (such as within the same integrated circuit (IC) package), and/or the memory 414 may be external to the processor 410 and functionally coupled over a data bus.

The UE 400 may include a user interface 450 that provides any suitable interface systems, such as a microphone/speaker 452, keypad 454, and display 456 that allow user interaction with the UE 400. The microphone/speaker 452 provides for voice communication services with the UE 400. The keypad 454 includes any suitable buttons for user input to the UE 400. The display 456 includes any suitable display, such as, for example, a backlit liquid crystal display (LCD), and may further include a touch screen display for additional user input modes.

In an aspect, the UE 400 may include a relay acquisition assistance module 170 functionally coupled to or integrated into the processor 410. The relay acquisition assistance module 170 may be a hardware, software, or firmware component that, when executed, causes the UE 400 to perform the operations described herein. For example, the relay acquisition assistance module 170 may be a software module stored in memory 414 and executable by the processor 410. As another example, the relay acquisition assistance module 170 may be a hardware circuit (such as an ASIC, a field programmable gate array (FPGA), etc.) within the UE 400. The functions of the of the collision deterrence module will be discussed in greater detail below.

V2X communications in 5G can occur in both FR1 (sub-6 GHz, such as 450 MHz-6 GHz) and FR2 (mmW band, such as 24250 MHz-52600 MHz). For mmW unicast D2D or V2V communications, the initial communication establishment between neighboring devices (such as used herein as vehicles V-UEs 302 and 304 solely for illustration and not limitation) can be accomplished respectively in two different approaches in two deployment options, a standalone (SA) deployment and a non-standalone (NSA) deployment. In SA deployment, only the mmW frequency band can be used. A mmW radio sidelink can be established between two vehicles without the support of any other previously established communication link that may be, for example, in a different frequency band or in a different RAT.

Alternatively, establishment of the unicast mmW sidelink, including radio bearer establishment and associated QoS negotiation, can occur in the NSA deployment option. In the NSA deployment option, UEs can support communication in both FR1 and FR2. Thus, it is possible that the D2D or V2V mmW sidelink in FR2 (which uses a specific type of radio bearer configured for communication in mmW) is established with the support of a previously established direct link/connection (such as sidelink 330) between the two V-UEs in FR1 with PC5-RRC signaling and/or device-to-device discovery mechanisms. In this approach, for example, one or more signaling radio bearers (SRBs) may be established over the FR 1 sidelink first, and then, one or more data radio bearers (DRBs) may be established over the FR2 sidelink.

Radio bearers are logical communication channels offered by Layer 2 to higher layers for the transfer of either user data (on DRBs) for a communication session or control data (on SRBs) for the communication session. An SRB carries dedicated control channel (DCCH) signaling data for a communication session. (A DCCH is a point-to-point dedicated channel for transmitting control information between a UE and the network or another UE.) An SRB is used during connection establishment to deliver control signaling while on the connection. During connection establishment, an RRC Connection Setup procedure establishes the SRB. The SRB is then used to send all subsequent control signaling (such as physical layer, MAC layer, and other access layer control information) to start the desired communication session and establish the DRBs for the communication. A DRB carries dedicated traffic channel (DTCH) data for a communication session. (A DTCH is a point-to-point dedicated channel for transmitting user/application data/traffic between a UE and the network or another UE.) Establishment of the DRBs is achieved using an RB Setup procedure on the SRB. The RB Setup procedure configures how both the DCCH and DTCH will be carried on the respective radio bearers.

Using the SRB, the configuration of the different access protocol layers are of a semi-static nature. Physical layer control is of a more dynamic nature in order to control resource allocation, in terms of time, frequency, space, and/or power. The access protocol layer configurations over the SRB occur at the time the radio bearer is being set up. The physical layer control and adaptation generally occur at the time the data is being exchanged.

Figure 5:
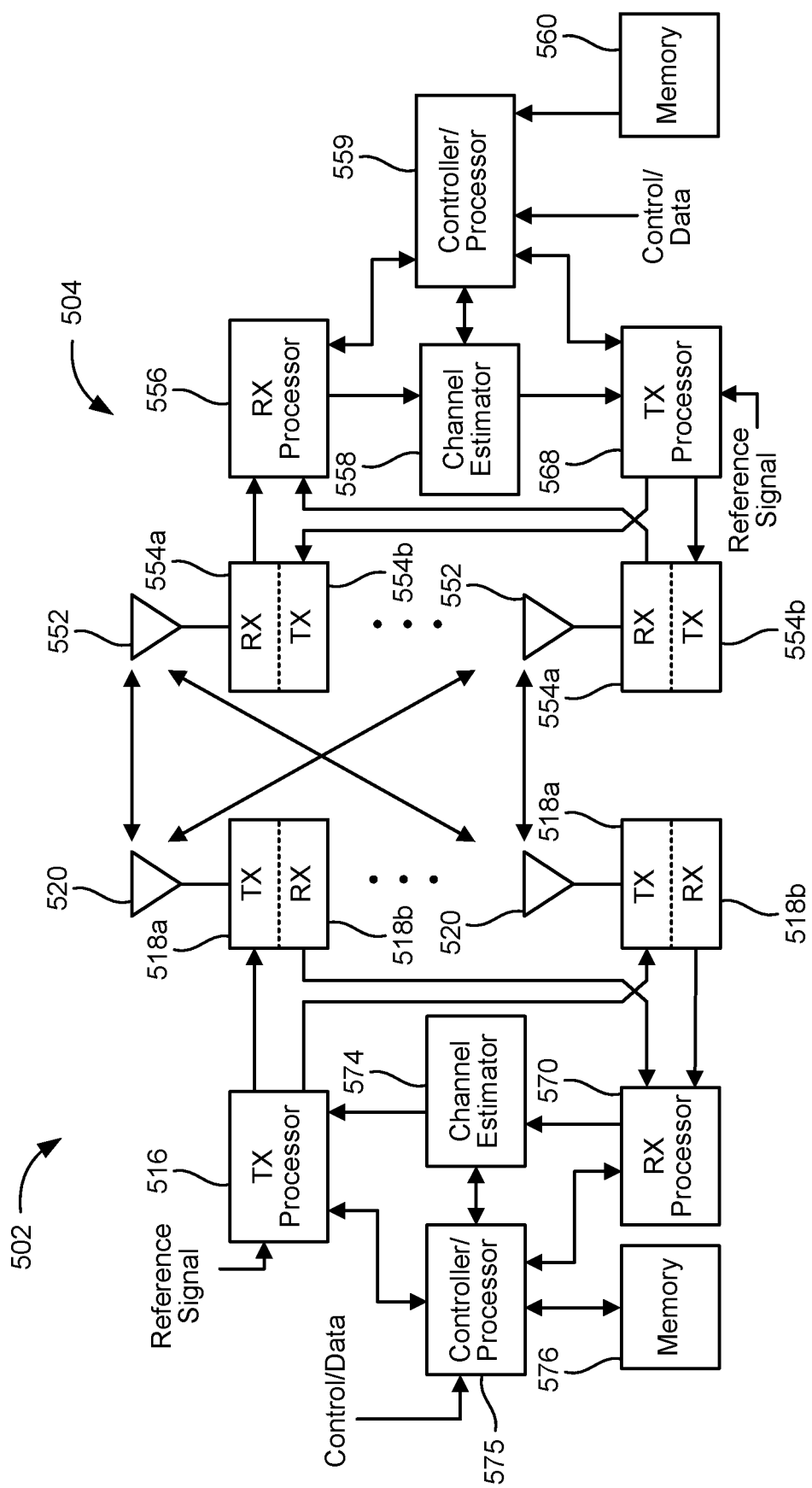
FIG. 5 is a block diagram illustrating various components of an UE and base station according to at least one aspect of the disclosure.

FIG. 5 illustrates a base station 502 (such as an eNB, a gNB, a small cell AP, a WLAN AP, etc.) in communication with an UE 504 or relay 504 in a wireless network, according to aspects of the disclosure. As discussed herein, a relay may include various components and functionalities related to a UE from the perspective of donor base stations serving the relay. Accordingly, the device referenced as 504 may be either a UE 504 or relay 504, but will generally be referred to as UE 504 for purposes of explanation. The base station 502 may correspond to any of base stations 102, 150, and 180 in FIG. 1 or gNB 222 or eNB 224 in FIGS. 2A and 2B, and the UE 504 may correspond to any of UEs 104, 152, 182, 160, 190 in FIG. 1, UE 240 in FIGS. 2A and 2B, UEs 302 and 304 in FIG. 3 or UE 400 in FIG. 4. In the DL, IP packets from the core network (NGC 210/EPC 260) may be provided to a controller/processor 575. The controller/processor 575 implements functionality for a radio resource control (RRC) layer, a packet data convergence protocol (PDCP) layer, a radio link control (RLC) layer, and a medium access control (MAC) layer. The controller/processor 575 provides RRC layer functionality associated with broadcasting of system information (such as MIB, SIBs), RRC connection control (such as RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 516 and the receive (RX) processor 570 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 516 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (such as pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 504. Each spatial stream may then be provided to one or more different antennas 520 via a separate transmitter 518a. Each transmitter 518a may modulate an RF carrier with a respective spatial stream for transmission.

At the UE 504, each receiver 554a receives a signal through its respective antenna 552. Each receiver 554a recovers information modulated onto an RF carrier and provides the information to the RX processor 556. The TX processor 568 and the RX processor 556 implement Layer-1 functionality associated with various signal processing functions. The RX processor 556 may perform spatial processing on the information to recover any spatial streams destined for the UE 504. If multiple spatial streams are destined for the UE 504, they may be combined by the RX processor 556 into a single OFDM symbol stream. The RX processor 556 then converts the OFDM symbol stream from the time-domain to the frequency domain using a fast Fourier transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 502. These soft decisions may be based on channel estimates computed by the channel estimator 558. The soft decisions are then decoded and de-interleaved to recover the data and control signals that were originally transmitted by the base station 502 on the physical channel. The data and control signals are then provided to the controller/processor 559, which implements Layer-3 and Layer-2 functionality.

The controller/processor 559 can be associated with a memory 560 that stores program codes and data. The memory 560 may be referred to as a computer-readable medium. In the UL, the controller/processor 559 provides demultiplexing between transport and logical channels, packet reassembly, deciphering, header decompression, and control signal processing to recover IP packets from the core network. The controller/processor 559 is also responsible for error detection.

Similar to the functionality described in connection with the DL transmission by the base station 502, the controller/processor 559 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator 558 from a reference signal or feedback transmitted by the base station 502 may be used by the TX processor 568 to select the appropriate coding and modulation schemes, and to facilitate spatial processing. The spatial streams generated by the TX processor 568 may be provided to different antenna 552 via separate transmitters 554b. Each transmitter 554b may modulate an RF carrier with a respective spatial stream for transmission. In an aspect, the transmitters 554b and the receivers 554a may be one or more transceivers, one or more discrete transmitters, one or more discrete receivers, or any combination thereof.

The UL transmission is processed at the base station 502 in a manner similar to that described in connection with the receiver function at the UE 504. Each receiver 518b receives a signal through its respective antenna 520. Each receiver 518b recovers information modulated onto an RF carrier and provides the information to a RX processor 570. In an aspect, the transmitters 518a and the receivers 518b may be one or more transceivers, one or more discrete transmitters, one or more discrete receivers, or any combination thereof.

The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover IP packets from the UE 504. IP packets from the controller/processor 575 may be provided to the core network. The controller/processor 575 is also responsible for error detection.

The various aspects disclosed include techniques fleet systems or other network configurations which use relays to provide network connectivity to various UEs. It will be appreciated that the relay may be viewed as a mobile access point from the UE, but as a UE from the perspective of its serving base station (such as eNB, gNB, etc.). Additionally, the relay and UE may connect via a D2D interface such as PC5 discussed herein.

Figure 6A:
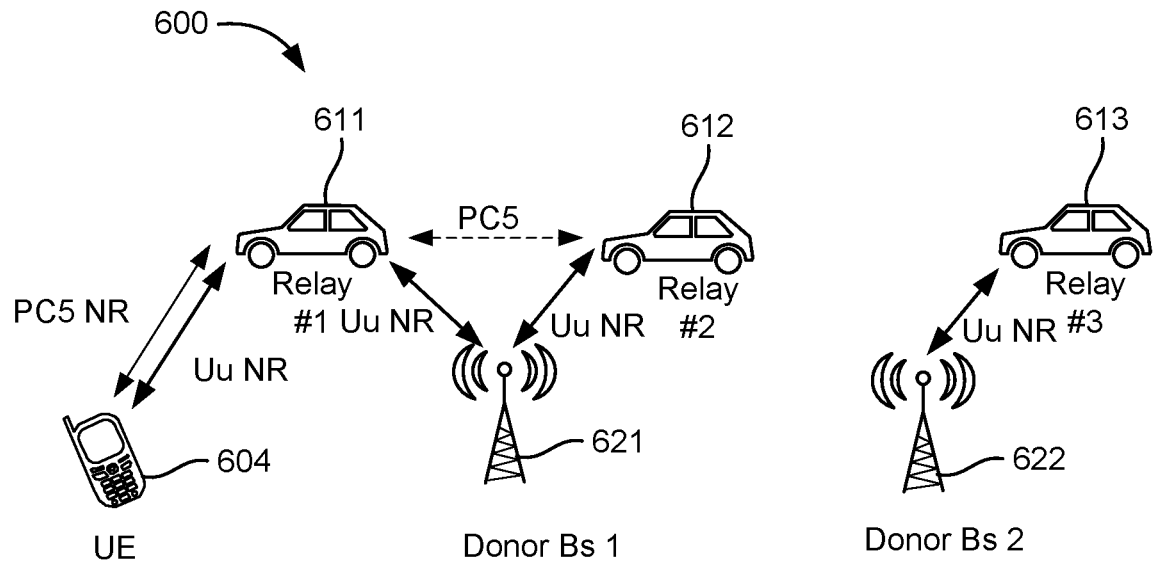
FIG. 6A illustrates an example relay networking system according to aspects of the disclosure.

For example, FIG. 6A illustrates an example relay networking system 600 (such as fleet network or other network using relays) according to aspects of the disclosure. The relays 611, 612 and 613 may be placed in vehicles or other mobile platforms. The relays 611, 612 and 613 provide coverage to neighboring UEs (which can be in the vehicle itself, or in the vicinity of the vehicle), such as UE 604. The relays can obtain coverage from stationary base stations (such as gNBs, eNBs, etc.) in the macro network (such as wireless communication system 100), these base stations may also be referred herein to as a "donor Bs", such as donor Bs 621 and donor Bs 622. The radio link between a donor Bs (e.g, donor Bs 621 or donor Bs 622) and a relay (such as relay 611, relay 612 or relay 613) uses Uu NR (such as as specified in 3GPP Release 15). For example, relay 611 has a radio link to donor Bs 621 and relay 612 also has a radio link to donor Bs 621. Likewise, relay 613 has a radio link to donor Bs 622. Accordingly, it will be appreciated that more than one relay be in communication with a given donor Bs. Also, it will be appreciated that more than one UE can be connected to a relay via one or more radio links, although only UE 604 and relay 611 are illustrated. The link between a UE and a relay can use Uu NR or PC5 NR as specified in 3GPP Release 15, or a combination of both. For example, UE 604 can communicate to relay 611 using either Uu NR, PC5 or a combination of both. Additionally, in some aspects, there may be a PC5 NR link between relays (such as the PC5 link between relay 611 and relay 612). In some aspects, the relay networking system re-uses the Integrated Access and Backhaul (IAB) architecture selected by 3GPP in Rel-16 to enable a wireless backhaul through multi-hop L2 relay networks (see, such as Architecture 1a in TR 38.874).

Figure 6B:
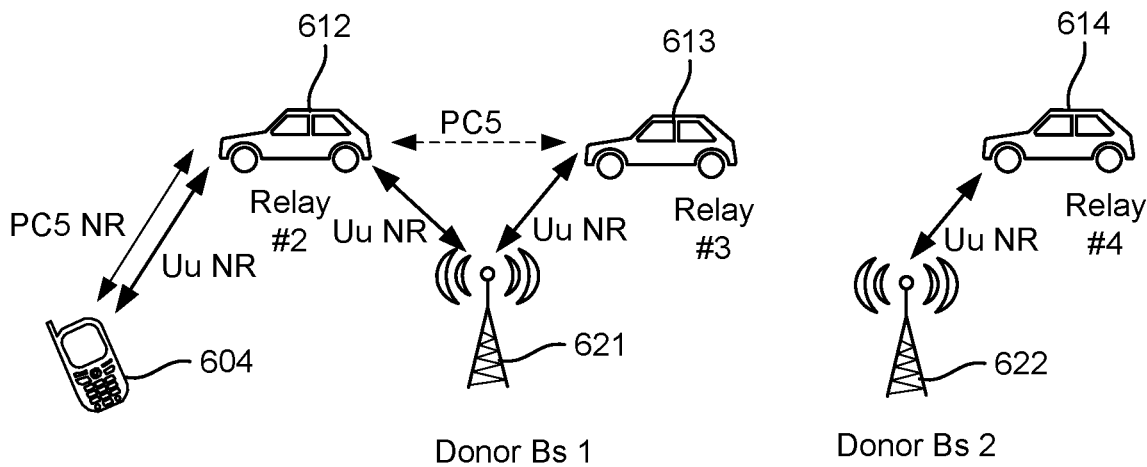
FIG. 6B illustrates an example relay networking system at another point in time according to aspects of the disclosure.

FIG. 6B illustrates the example relay networking system 600 at a different time according to aspects of the disclosure. As noted above, the relays 612, 613 and 614 may be placed in vehicles or other mobile platforms. Accordingly, in the relay networking system 600, relays providing service to the UEs may be moving. This presents challenges as the relays available to the UE (such as UE 604) may change over time. Additionally, the mobility or the relays can cause the relay to have to handover from one donor Bs to another. For example, relay 613 changed to donor Bs 621 from donor Bs 622 in the time interval illustrated between FIG. 6A and FIG. 6B. Also, UE 604 is linked to relay 612 in FIG. 6B instead of relay 611 as illustrated in FIG. 6A. Thus, it will be appreciated that the list of neighboring relays that the UE is expected to see while camped on a particular relay can be changing over time. If the UE in idle mode always selects the best cell based on the UEs scanning, as in traditional network solutions, the UE will have to perform very frequent reselections. Consequently, a neighbor list in idle mode is useful in the fleet network systems or other systems that use relays for connectivity to UE to reduce the number of reselections. In connected mode, according to various aspects disclosed, the neighbor lists can be dynamically updated and sent to the UE, based on the UE's location and/or the relays locations, since the relays providing service to the UEs are moving, and thus the list of neighboring relays that the UE is expected to see while camped on a particular relay keeps changing.

Figure 6C:
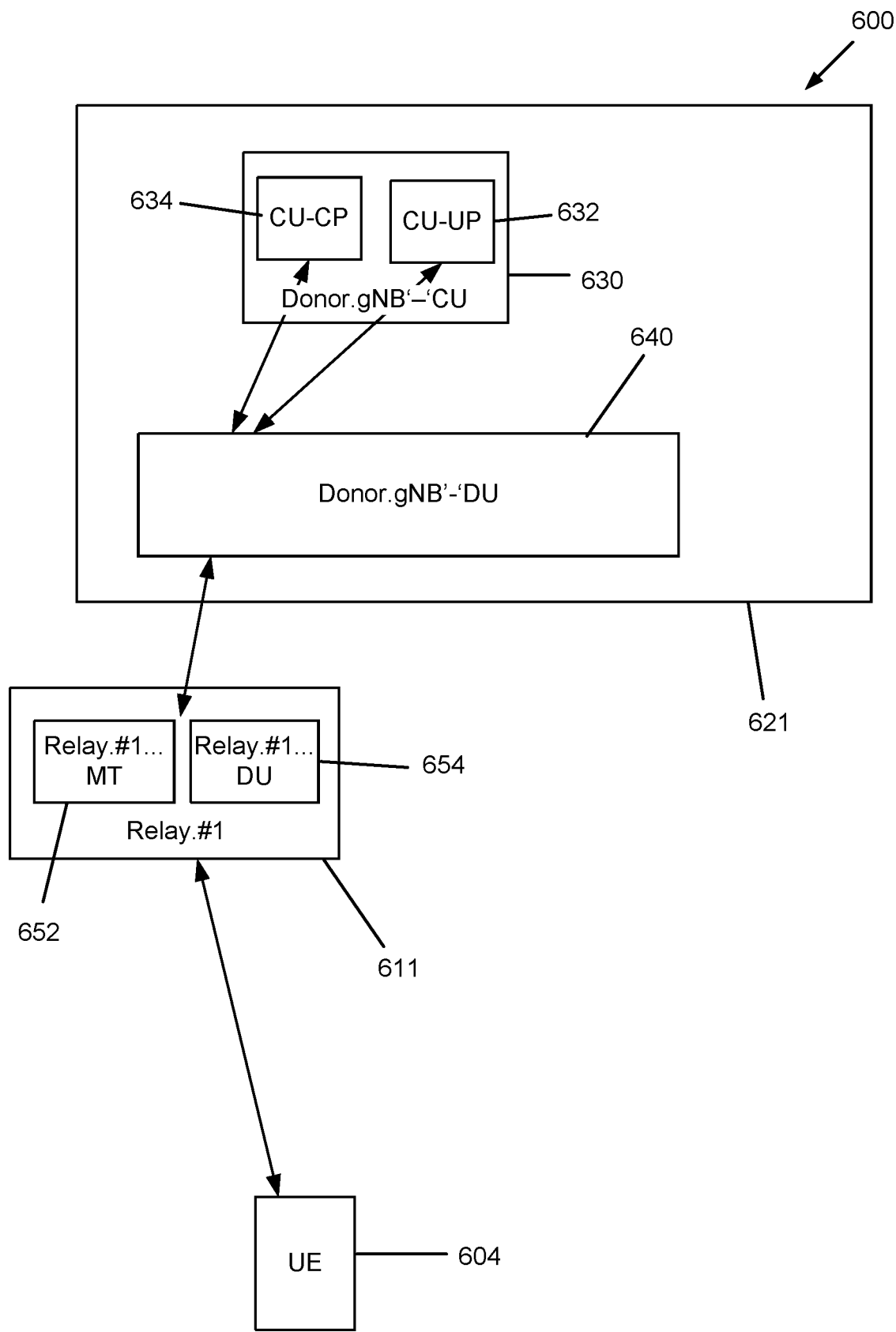
FIG. 6C illustrates an example relay networking system at another point in time according to aspects of the disclosure.

FIG. 6C illustrates the example relay networking system 600 in functional blocks according to aspects of the disclosure. As noted above, in some aspects, the relay networking system 600 re-uses the Integrated Access and Backhaul (IAB) architecture selected by 3GPP in Rel-16 to enable a wireless backhaul through multi-hop L2 relay networks. It will be appreciated that in some aspects, the equivalent of a donor Bs 621 (e.g, donor gNB) in the relay networking system 600 has the functionality of a centralized unit (CU) 630 and distributed unit (DU) 640. It will be appreciated that other functional aspects of the donor Bs 621 are not illustrated here, but are discussed in the foregoing in relation to the various base stations (such as gNB, eNB, etc.) illustrated and discussed. The CU 630 can be further disaggregated into the CU user plane (CU-UP) 632 and CU control plane (CU-CP) 634, both of which connect to the DU over F1-U and F1-C interfaces, respectively. Relay 611 can include mobile-termination (MT) 652 function and DU 654. It will be appreciated that other functional aspects and components of the relay 611 are not detailed here, but are discussed in the foregoing (e.g, 504 and general UE communication functionalities). MT 652 function terminates the radio interface layers of the backhaul Uu interface toward the donor Bs 621 or other relays (not illustrated). Accordingly, the MT 652 of the relay connects to an upstream relay (not illustrated) or the donor Bs 621. The DU 654 function of the relay establishes RLC-channels to UEs (e,g, UE 604) and to MTs of downstream relays (not illustrated). It will be appreciated that in some aspects, the relay 611 and/or donor Bs 621 may contain multiple DUs. Although not expressly illustrated, it will be appreciated that the donor Bs 621 DU 640 may support connections to UEs (such as UE 604) and additional MTs of downstream relays. In some aspects, the donor Bs 621 holds a CU 630 for the DUs of all relays and for its own DU 640. According to various aspects disclosed, the DUs (such as DU 654) on a relay 611 are served by only one donor Bs 621. This donor Bs 621 may change as illustrated in FIGS. 6A and 6B.

Figure 7:
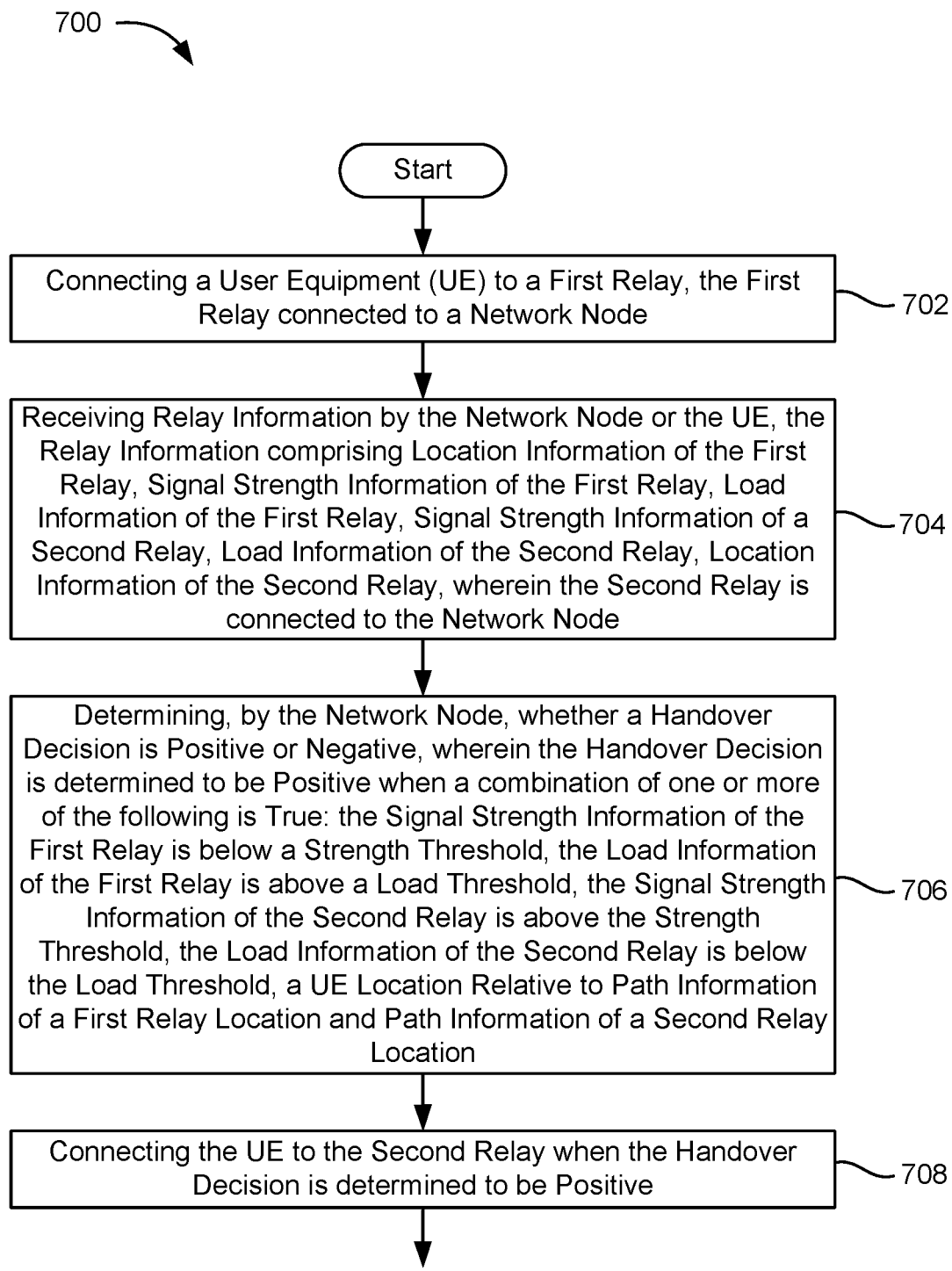
FIG. 7 illustrates an example partial flowchart of one or more methods according to aspects of the disclosure.

FIG. 7 illustrates an example partial flowchart of one or more methods according to aspects of the disclosure. As shown in FIG. 7, a partial method 700 may begin in block 702 with connecting a user equipment (UE) to a first relay, the first relay connected to a network node. The partial method 700 may continue in block 704 with receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node. The partial method 700 may continue in block 706 with determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to the path information of the first relay location and the path information of the second relay location. The partial method 700 may conclude in block 708 with connecting the UE to the second relay when the handover decision is determined to be positive.

In addition, partial method 700 may also include additional features wherein the relay information is received from one of the first relay or the second relay, the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest, the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest, the relay information is received from the UE or from the first relay by the network node and further includes the UE location, the relay information is received from the UE by the network node periodically or based on a combination of one or more of the following occurrences: the signal strength information of the first relay falling below a strength threshold, the signal strength information of the second relay falling below a strength threshold, a velocity of the UE exceeding a velocity threshold, or the UE location entering or exiting an area of interest, the location information of the first relay includes a current location and an expected path of the first relay, and the location information of the second relay includes a current location and an expected path of the second relay, and the current location of the first relay and the current location of the second relay are periodically received.

It should be understood that UE location information may be provided in addition to the relay information being received from the UE or from the first relay by the network node and may be provided by a location server/LMF.

Figure 8:
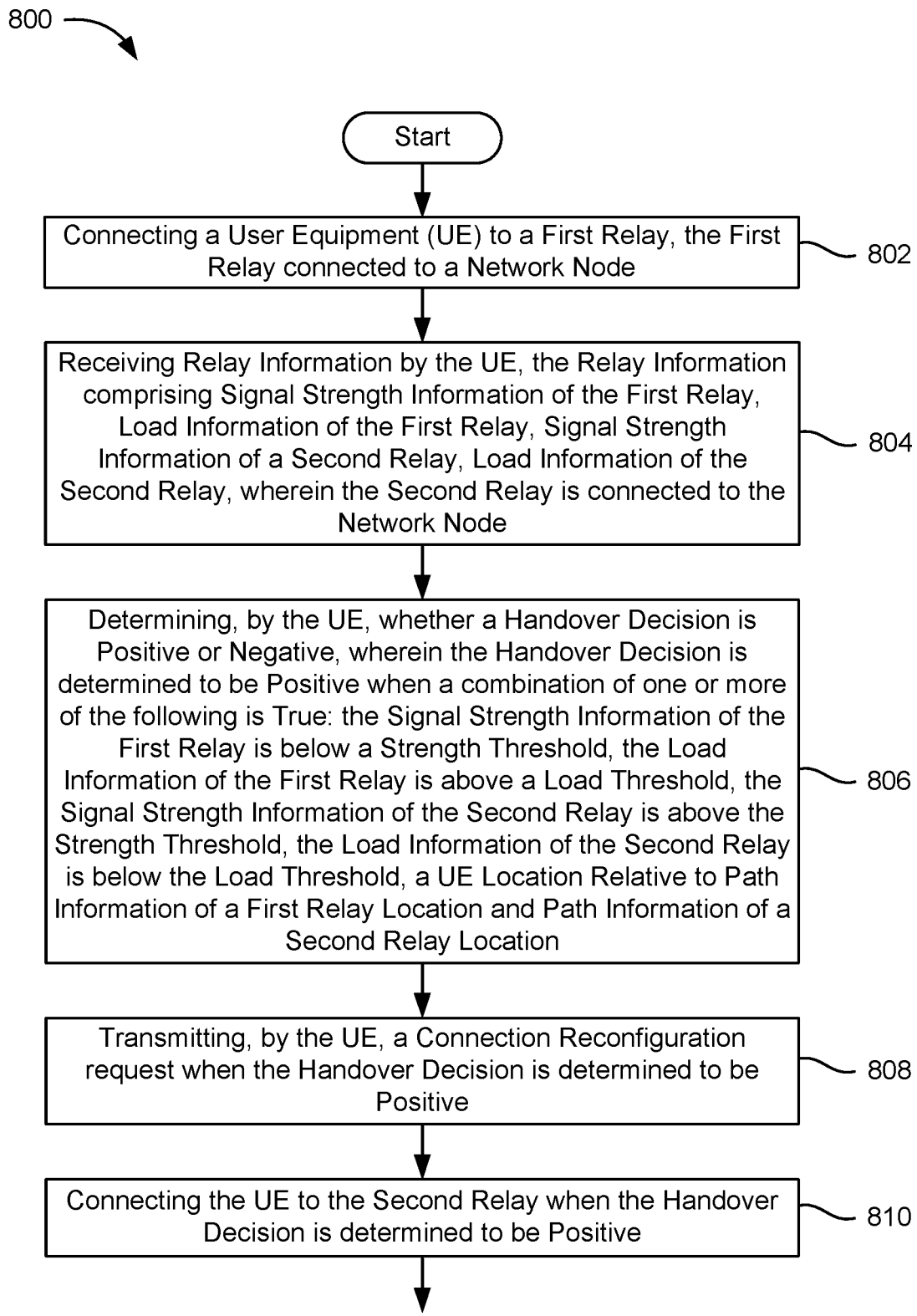
FIG. 8 illustrates an example partial flowchart of one or more methods according to aspects of the disclosure.

FIG. 8 illustrates an example partial flowchart of one or more methods according to aspects of the disclosure. As shown in FIG. 8, a partial method 800 may begin in block 802 with connecting a user equipment (UE) to a first relay, the first relay connected to a network node. The partial method 800 may continue in block 804 with receiving relay information by the UE, the relay information comprising signal strength information of the first relay, load information of the first relay, signal strength information of a second relay, load information of the second relay, wherein the second relay is connected to the network node. The partial method 800 may continue in block 806 with determining, by the UE, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location. The partial method 800 may continue in block 808 with transmitting, by the UE, a connection reconfiguration request when the handover decision is determined to be positive. The partial method 800 may conclude in block 810 with connecting the UE to the second relay when the handover decision is determined to be positive.

In addition, partial method 800 may also include additional features wherein the connection reconfiguration request is transmitted to the first relay and includes the load information of the first relay and the load information of the second relay, the connection reconfiguration request is transmitted to the network node, and the relay information is received from one of the first relay or the second relay.

Figure 9:
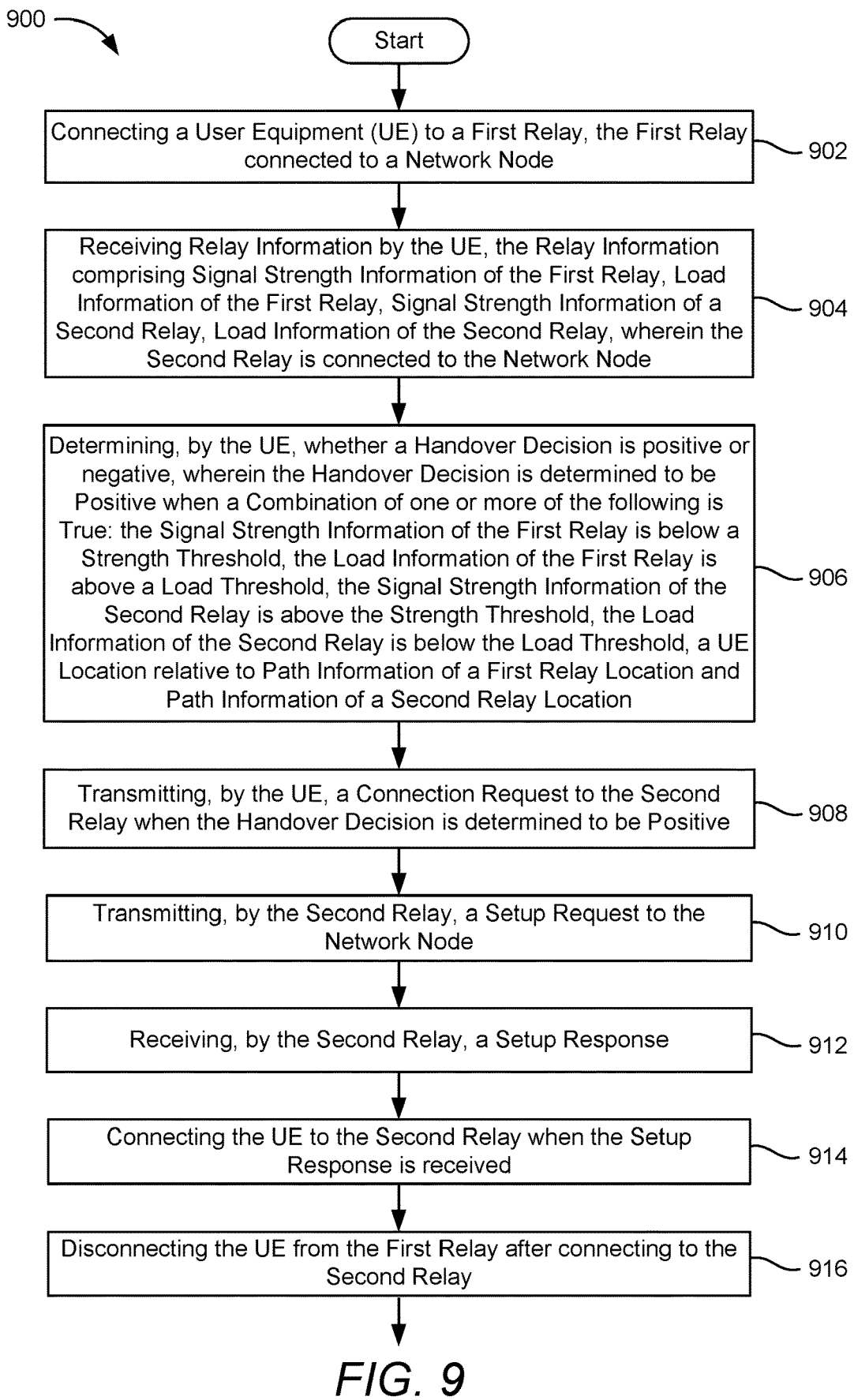
FIG. 9 illustrates an example partial flowchart of one or more methods according to aspects of the disclosure.

FIG. 9 illustrates an example partial flowchart of one or more methods according to aspects of the disclosure. As shown in FIG. 9, a partial method 900 may begin in block 902 with connecting a user equipment (UE) to a first relay, the first relay connected to a network node. The partial method 900 may continue in block 904 with receiving relay information by the UE, the relay information comprising signal strength information of the first relay, load information of the first relay, signal strength information of a second relay, load information of the second relay, wherein the second relay is connected to the network node. The partial method 900 may continue in block 906 with determining, by the UE, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location. The partial method 900 may continue in block 908 with transmitting, by the UE, a connection request to the second relay when the handover decision is determined to be positive. The partial method 900 may continue in block 910 with transmitting, by the second relay, a setup request to the network node. The partial method 900 may continue in block 912 with receiving, by the second relay, a setup response. The partial method 900 may continue in block 914 with connecting the UE to the second relay when the setup response is received. The partial method 900 may conclude in block 916 with disconnecting the UE from the first relay after connecting to the second relay. In addition, partial method 900 may also include additional features wherein the network node transmits a release request to the first relay and the first relay transmits a release confirmation to the network node.

Figure 10:
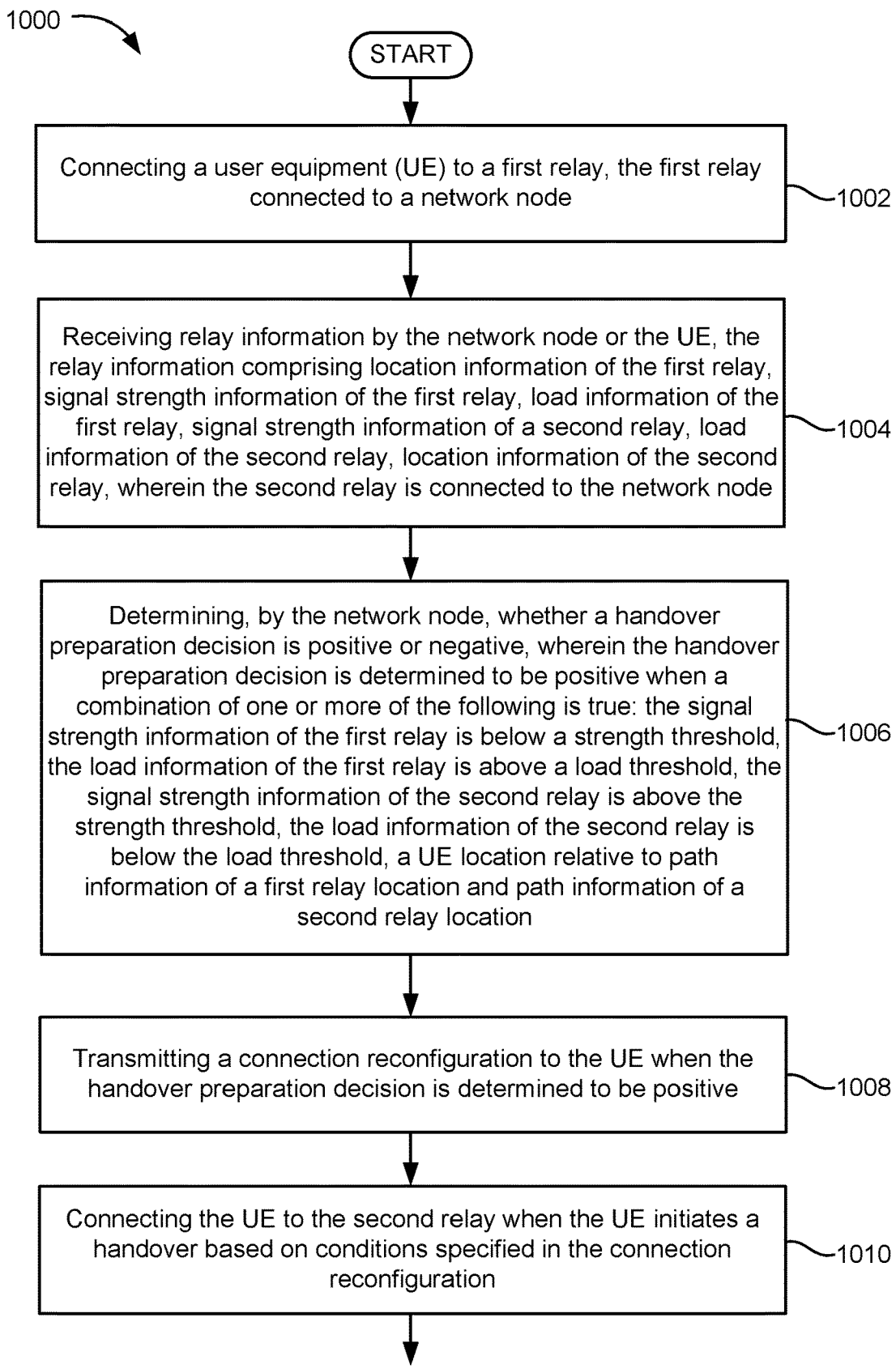
FIG. 10 illustrates an example partial flowchart of one or more methods according to aspects of the disclosure.

FIG. 10 illustrates an example partial flowchart of one or more methods according to aspects of the disclosure. As shown in FIG. 10, a partial method 1000 may begin in block 1002 with connecting a user equipment (UE) to a first relay, the first relay connected to a network node. The partial method 1000 may continue in block 1004 with receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node. The partial method 1000 may continue in block 1006 with determining, by the network node, whether a handover preparation decision is positive or negative, wherein the handover preparation decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to the path information of the first relay location and the path information of the second relay location. The partial method 1000 may continue in block 1008 with transmitting a connection reconfiguration to the UE when the handover preparation decision is determined to be positive. The partial method 1000 may conclude in block 1010 with connecting the UE to the second relay when the UE initiates the handover based on conditions specified in the connection reconfiguration.

In addition, partial method 1000 may also include additional features wherein the relay information is received from one of the first relay or the second relay and wherein the connection reconfiguration includes information to set up the connection on the second relay and reconfiguration conditions for the UE to initiate the connection to the second relay, the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest, the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest, the relay information is received from the UE or the first relay by the network node and further includes the UE location, the relay information is received from the UE by the network node periodically or based on a combination of one or more of the following occurrences: the signal strength information of the first relay falling below a strength threshold, the signal strength information of the second relay falling below a strength threshold, a velocity of the UE exceeding a velocity threshold, or the UE location entering or exiting an area of interest, the location information of the first relay includes a current location and an expected path of the first relay, and the location information of the second relay includes a current location and an expected path of the second relay, and the current location of the first relay and the current location of the second relay are periodically received.

The functionality of the various devices, components, methods, etc. disclosed herein may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (such as an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (such as of an integrated circuit and/or of a set of software modules) may provide at least a portion of the functionality for more than one module.

Figure 11:
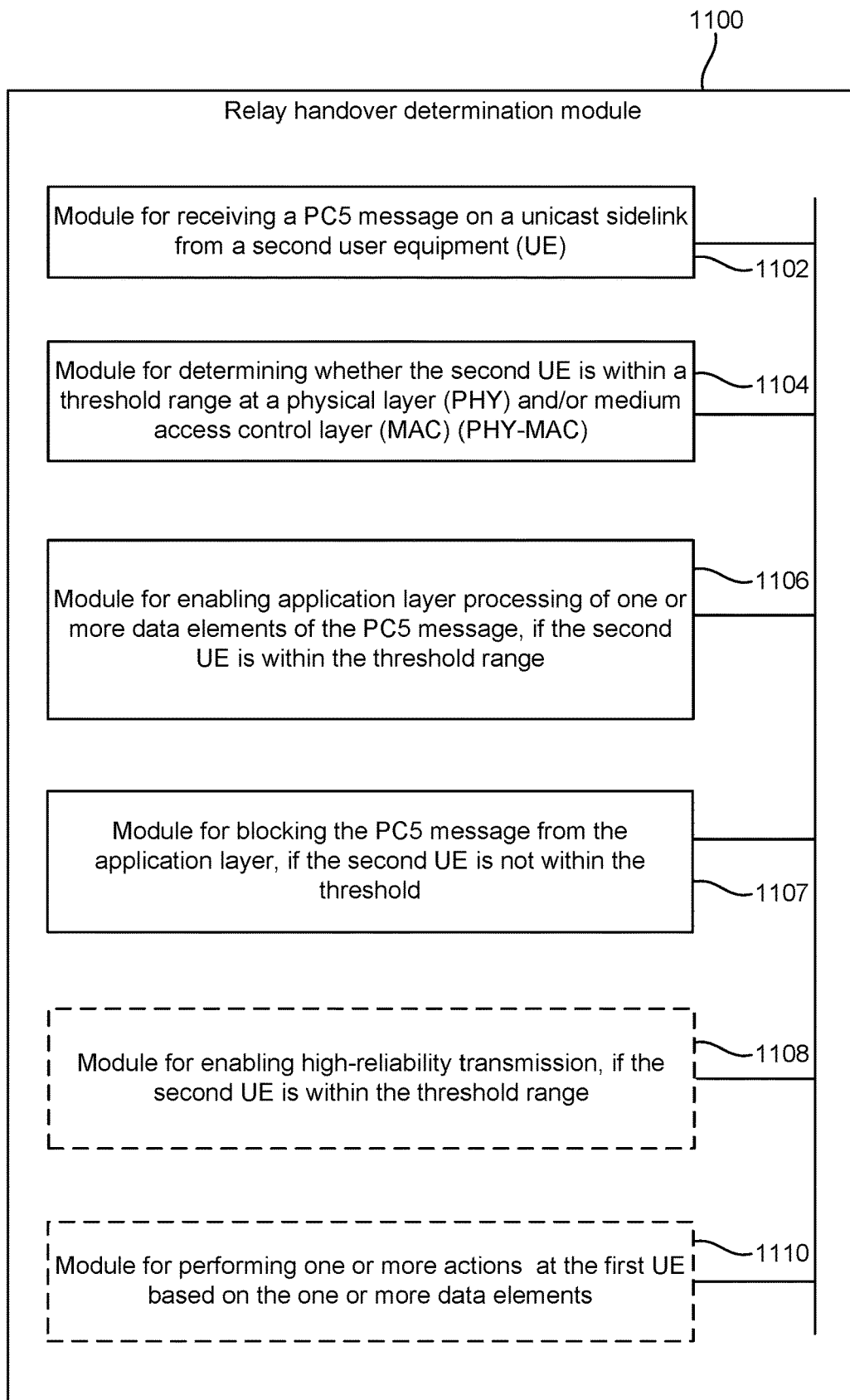
FIG. 11 illustrates an example device for implementing aspects of the disclosure represented as a series of interrelated functional modules.

FIG. 11 illustrates an example device 1100 for implementing various aspects of the disclosure, which are represented as a series of interrelated functional modules. The device 1100 may correspond to any of the UEs depicted in FIG. 1, such as UEs 104, 152, 160, 182, 190, any of UEs 240 depicted in FIGS. 2A and 2B, any of UEs 302, 304 in FIG. 3, or UE 400 in FIG. 4. In the illustrated example, a module 1802 for receiving a PC5 message on a unicast sidelink from a second user equipment (UE); may correspond at least in some aspects to, for example, a communication device (such as transceiver 404 and/or a processing system (such as processors 410), etc.) as discussed herein. A module 1104 for determining whether the second UE is within a threshold range at the PHY-MAC; may correspond at least in some aspects to, for example, a communication device (such as transceiver 404) and/or a processing system, such as processor 410) and in some aspects may be functions of the PHY-MAC layers (such as 520, 524) of a modem processor, as discussed herein. A module 1106 for enabling application layer processing of one or more data elements of the PC5 message, if the second UE is within the threshold range, may correspond at least in some aspects to, for example, a communication device (such as transceiver 404, processor 410, etc.) as discussed herein and in some aspects to an application layer processor that performs processing at an application layer (such as 510). A module 1107 for blocking the PC5 message from the application layer, if the second UE is not within the threshold range, may correspond at least in some aspects to, for example, a communication device (such as transceiver 404 and/or a processing system such as processor 410) and in some aspects may be functions of the PHY-MAC layers (such as 520, 524) of a modem processor, as discussed herein. An optional module 1108 for enabling high-reliability transmission, if the second UE is within the threshold range, may correspond at least in some aspects to a communication device (such as transceiver 404). Another optional module 1110 for performing one or more actions at the first UE based on the one or more data elements, may be for example, a processing system (such as processor 410) or may be an application processor configured to perform functions at the application layer (such as 510, 514), as discussed herein.

Figure 12A:
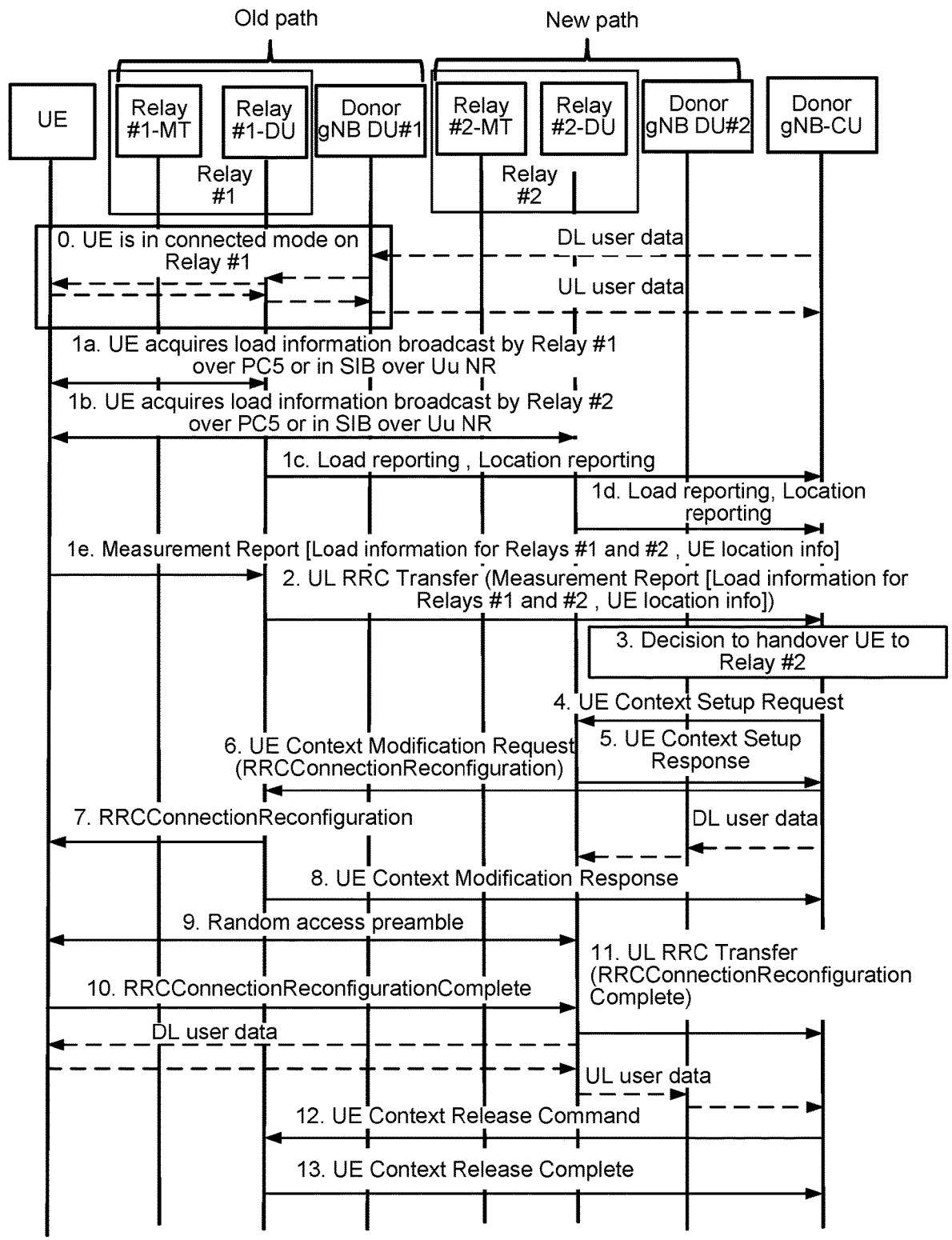
FIGS. 12A-D illustrate process flows for implementing aspects of the disclosure.

It will be appreciated from the disclosure herein that other methods and variations of methods can be recognized and detailed flowcharts and/or discussion of each will not be provided. Accordingly, the various aspects of the disclosure should not be construed to be limited to the illustrative examples provided. For instance, FIGS. 12A-D illustrate additional examples. As shown in FIG. 12A, a network-initiated handover of a UE based on signal strength, load information and expected path of relays may handover a UE from one relay to another relay under the same Donor gNB with the following enhancements: the decision to hand over the UE will take into account not only signal strength but also the load of the source relay and the target relay (For instance, the Donor gNB may decide to hand over a UE to another relay if the radio coverage provided to the UE by the serving relay is good but the serving relay is getting overloaded and there is a neighboring relay which is not overloaded and can provide adequate radio coverage to the UE); the load information can be provided to the Donor gNB by the relays themselves, or be acquired by the UE over PC5 and subsequently reported by the UE to the Donor gNB; and the decision to handover the UE can take into account information about the expected path of the serving relays and neighboring relays, for the case when the relays are placed in vehicles with a known path (buses, tramways, fleet of autonomous cars) (For instance, the Donor gNB may decide to proactively hand over a UE to another relay if the Donor gNB can predict that the serving relay will soon move away from the UE). In aspect of the solution, the decision to hand over the UE can take into account periodic location reporting from the relays from which the Donor gNB extrapolates the future position of relays. For instance, the Donor gNB may decide to proactively hand over a UE to another relay if the gNB can predict that the serving relay will soon move away from the UE based on past location reports from the serving relay.

In step 0, the UE is in connected mode on Relay #1, served by DU #1 of the Donor gNB. In step 1a, optionally, the UE acquires the load information broadcast by Relay #1. The acquisition can be: done in a periodic manner; and/or be event-triggered. Events to trigger the load information acquisition can include: the strength of the signal received by the UE from Relay #1 going above/below a certain threshold, the velocity of the UE going above a certain threshold, and the UE entering/exiting a specific geographical area. The load information of Relay #1 can be broadcast by Relay #1 in SIB, or broadcast by Relay #1 over PC5. The load information of Relay #1 can include a binary indication (overloaded/not overloaded) or of a quantitative indication (xx % loaded, where 100% indicates that the Relay cannot serve any more UEs).

In step 1b, optionally, the UE acquires the load information broadcast by Relay #2. Same description as in Step 1a applies. In step 1c, optionally, Relay #1 reports its load information and/or its location to the Donor gNB. The reporting can be: done in a periodic manner; and/or be event-triggered. Events to trigger the load information reporting can include: the load of Relay #1 going above/below a certain threshold. Events to trigger the location reporting can include: the strength of the signal received by Relay #1 from the Donor gNB going above/below a certain threshold, the velocity of Relay #1 going above a certain threshold, and Relay #1 entering/exiting a specific geographical area.

In step 1d, optionally, Relay #2 reports its load information and/or its location to the Donor gNB. Same description as in Step 1c applies. In step 1e, optionally, the UE sends a Measurement Report to Relay #1. The reporting can be: done in a periodic manner; and/or be event-triggered. Events to trigger the reporting can include: the strength of the signal received by the UE from Relay #1 going above/below a certain threshold, the strength of the signal received by the UE from Relay #2 going above/below a certain threshold, the velocity of the UE going above a certain threshold, and the UE entering/exiting a specific geographical area. The Measurement Report from the UE includes one or more of: signal strength of Relay #1, signal strength of Relay #2, load information for Relay #1, load information for Relay #2, and UE location information.

In step 2, Relay #1 sends the Measurement Report from the UE to the Donor gNB. In step 3, the Donor gNB determines to handover the UE to Relay #2. The decision to handover the UE can be based on a combination of one or more of the following criteria: the signal strength reported by the UE for Relay #1 goes below a certain threshold; the signal strength reported by the UE for Relay #2 goes above a certain threshold; based on the location information reported by Relay #1 and/or the location information reported by the UE, the Donor gNB determines that the UE will soon move away from the coverage of Relay #1; based on pre-known information about the expected future location of Relay #1 (for instance if Relay #1 is in a vehicle with a known path such as a bus or a tramway) and/or the location information reported by the UE, the Donor gNB determines that the UE will soon move away from the coverage of Relay #1; based on the location information reported by Relay #2 and/or the location information reported by the UE, the Donor gNB determines that the UE will soon move into the coverage of Relay #2; based on pre-known information about the expected future location of Relay #2 (for instance if Relay #2 is in a vehicle with a known path such as a bus or a tramway) and/or the location information reported by the UE, the Donor gNB determines that the UE will soon move into the coverage of Relay #2; and based on the load information reported by Relay #1 and/or Relay #2, or based on the load information reported by the UE for Relay #1 and Relay #2, the Donor gNB determines that Relay #1 is getting overloaded while Relay #2 can serve additional UEs, to the Donor gNB moves the UE from Relay #1 to Relay #2 for load balancing. Steps 4 to 13 are performed as currently specified in existing 3GPP specifications.

Figure 12B:
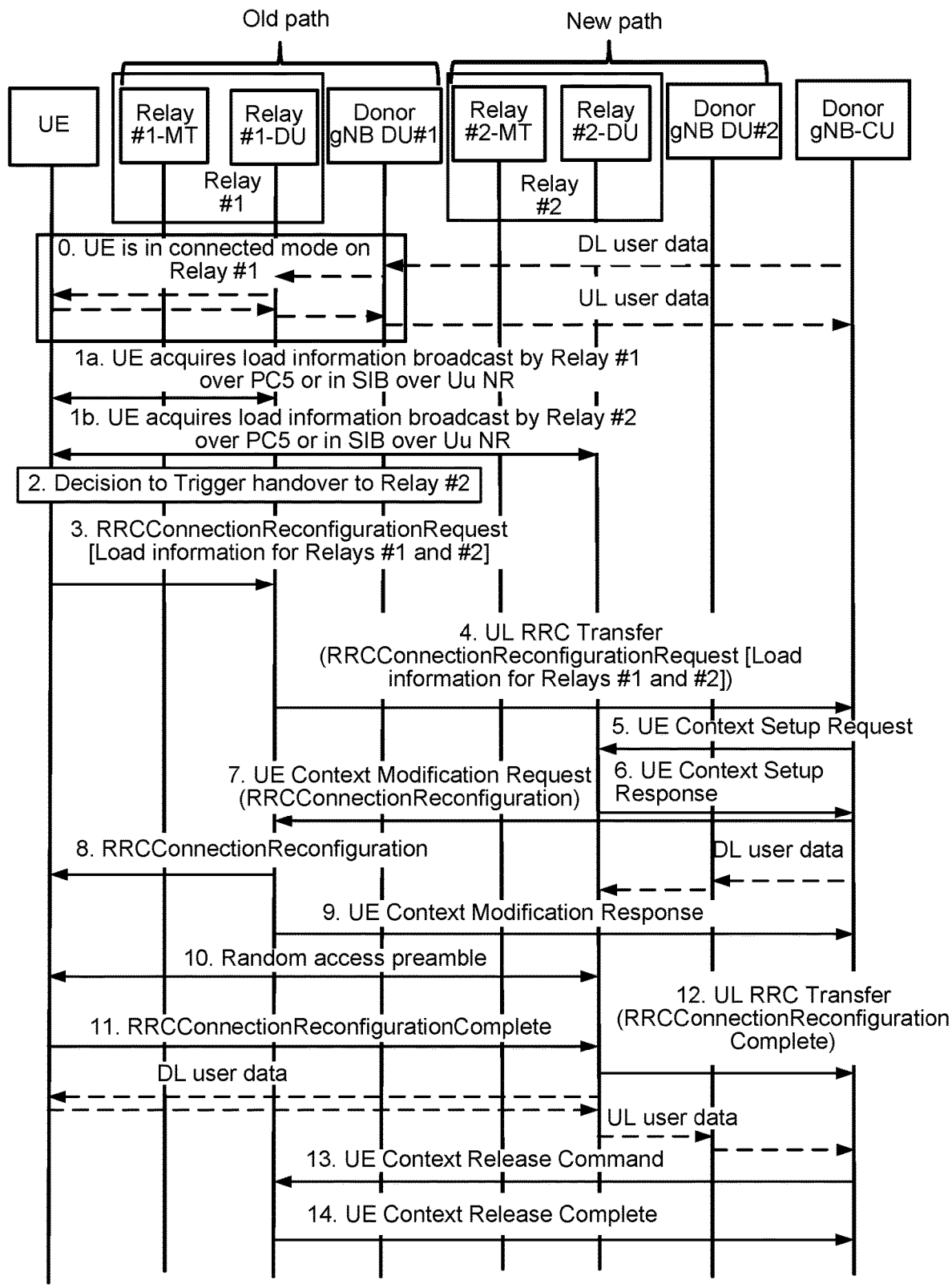

As shown in FIG. 12B, a UE-initiated handover of UE based on signal strength, load information and expected path of relays may include handover of a UE from one relay to another relay under the same Donor gNB with the following enhancements: the decision to trigger the handover is taken by the UE, not by the Donor gNB; to make the decision, the UE will take into account not only signal strength but also the load of the source relay and the target relay (For instance, the UE may decide to trigger the handover to another relay if the radio coverage provided to the UE by the serving relay is good but the serving relay is getting overloaded and there is a neighboring relay which is not overloaded and can provide adequate radio coverage to the UE); the load information is acquired by the UE over PC5 or over NR via a new indication broadcast by the relay; once the decision to trigger the handover is made by the UE, the UE sends dedicated signaling to the source relay to request a handover to the target relay (alternatively, if the UE supports dual Tx/Rx, the UE directly performs an access on the target relay to transfer ongoing sessions to the target relay. To ensure service continuity, the UE is dual-connected to the source and the target relay until the transfer of ongoing sessions is completed) (alternatively, the donor gNB prepares the candidate target relays reported by the UE, and the UE decides when and to which target relay to handover ("conditional handover" being specified by RAN2 for Rel-16)); and the UE may be configured with conditions for the UE-initiated handover such as discussed for conditions handover (CHO) in 3GPP, for example, the Donor gNB may configure the UE with events under which the UE can proactively initiate handover (These events may include load-, location-, distance- or proximity-related information and the load/location may refer to the service or the target relays (or stationary gNB-DUs') load or location).

In step 0, the UE is in connected mode on Relay #1, served by DU #1 of the Donor gNB. In step 1a, optionally, the UE acquires the load information broadcast by Relay #1. The acquisition can be: done in a periodic manner; and/or be event-triggered. Events to trigger the load information acquisition can include: the strength of the signal received by the UE from Relay #1 going above/below a certain threshold, the velocity of the UE going above a certain threshold, and the UE entering/exiting a specific geographical area. The load information of Relay #1 can be broadcast by Relay #1 in SIB, or broadcast by Relay #1 over PC5. The load information of Relay #1 can include a binary indication (overloaded/not overloaded) or of a quantitative indication (xx % loaded, where 100% indicates that the Relay cannot serve any more UEs).

In step 1b, optionally, the UE acquires the load information broadcast by Relay #2. Same description as in Step 1a applies. In step 2, the UE determines to trigger a handover to Relay #2. The decision to trigger the handover can be based on a combination of one or more of the following criteria: the signal strength reported by the UE for Relay #1 goes below a certain threshold, the signal strength reported by the UE for Relay #2 goes above a certain threshold, based on pre-known information about the expected future location of Relay #1 (for instance if Relay #1 is in a vehicle with a known path such as a bus or a tramway) and/or the UE's velocity and location information, the UE determines that the UE will soon move away from the coverage of Relay #1, based on pre-known information about the expected future location of Relay #2 (for instance if Relay #2 is in a vehicle with a known path such as a bus or a tramway) and/or the UE's velocity and location information, the UE determines that the UE will soon move into the coverage of Relay #2, and based on the load information reported by Relay #1 and/or Relay #2, or based on the load information reported by the UE for Relay #1 and Relay #2, the UE determines that Relay #1 is getting overloaded while Relay #2 can serve additional UEs, to the UE decides to move from Relay #1 to Relay #2 for load balancing.

In step 3, the UE sends an RRCConnectionReconfigurationRequest to Relay #1 requesting a handover to Relay #2. Optionally, the request includes the load information for Relay #1 and Relay #2. In step 4, Relay #1 sends the RRCConnectionReconfigurationRequest from the UE to the Donor gNB. Steps 5 to 14 may be performed as currently specified in existing 3GPP specifications. For example, in step 6, the UE is configured with CHO by the Donor gNB, where the conditions include a load-, location-, distance or distance-related information. The UE evaluates the load-related conditions by including load reports from the serving and/or target relays and/or target gNB-DUs. The UE evaluates the location-related conditions by including location reports from the serving and/or target relays and/or target gNB-DUs. The UE evaluates the distance- or proximity-related conditions by including a distance or proximity derived from location reports from the serving and/or target relays and/or target gNB-DUs and measurements of its own location. Where the load and location reports are broadcast OTA by the relays and/or gNB-DU, the load and location reports are unicast by the serving relay and/or gNB-DU, and the proximity or distance is based on the location of a relay and/or gNB-DU and the location of the UE.

Figure 12C:
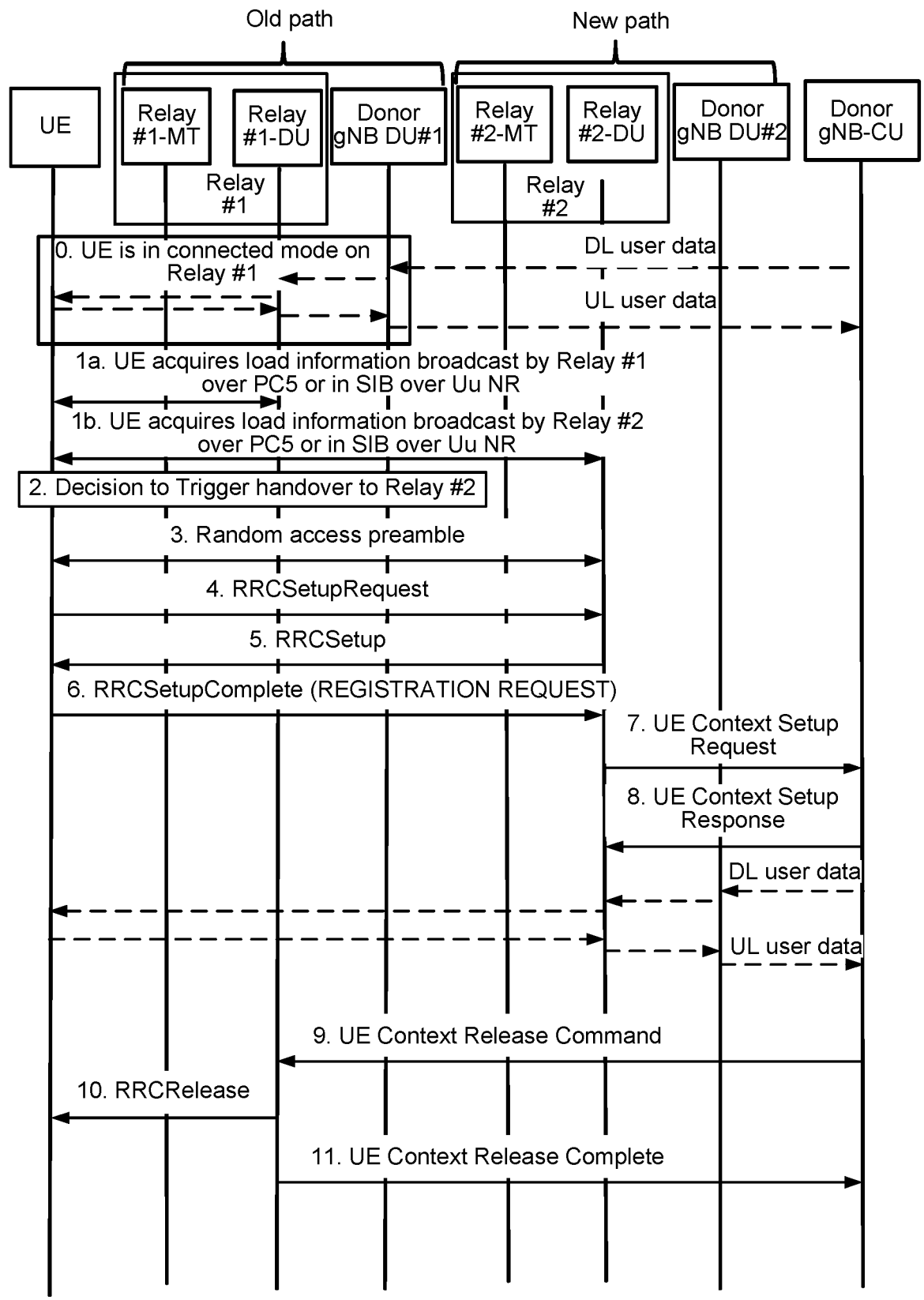

FIG. 12C illustrates another handover example. As shown in FIG. 12C, in steps 0-2, the steps 0 to 2 are the same as shown in FIG. 12B. In steps 3-6, the UE sets up an RRC connection on Relay #2 while still connected to Relay #1. In step 7, Relay #2 requests setting up the UE Context from the Donor gNB. In step 8, the Donor gNB sets up the UE's context. In step 9, the Donor gNB requests Relay #1 to release the UE's context. In step 10, Relay #1 releases the RRC connection to the UE. In step 11, Relay #1 confirms the release of the UE's context to the Donor gNB.

Figure 12D:
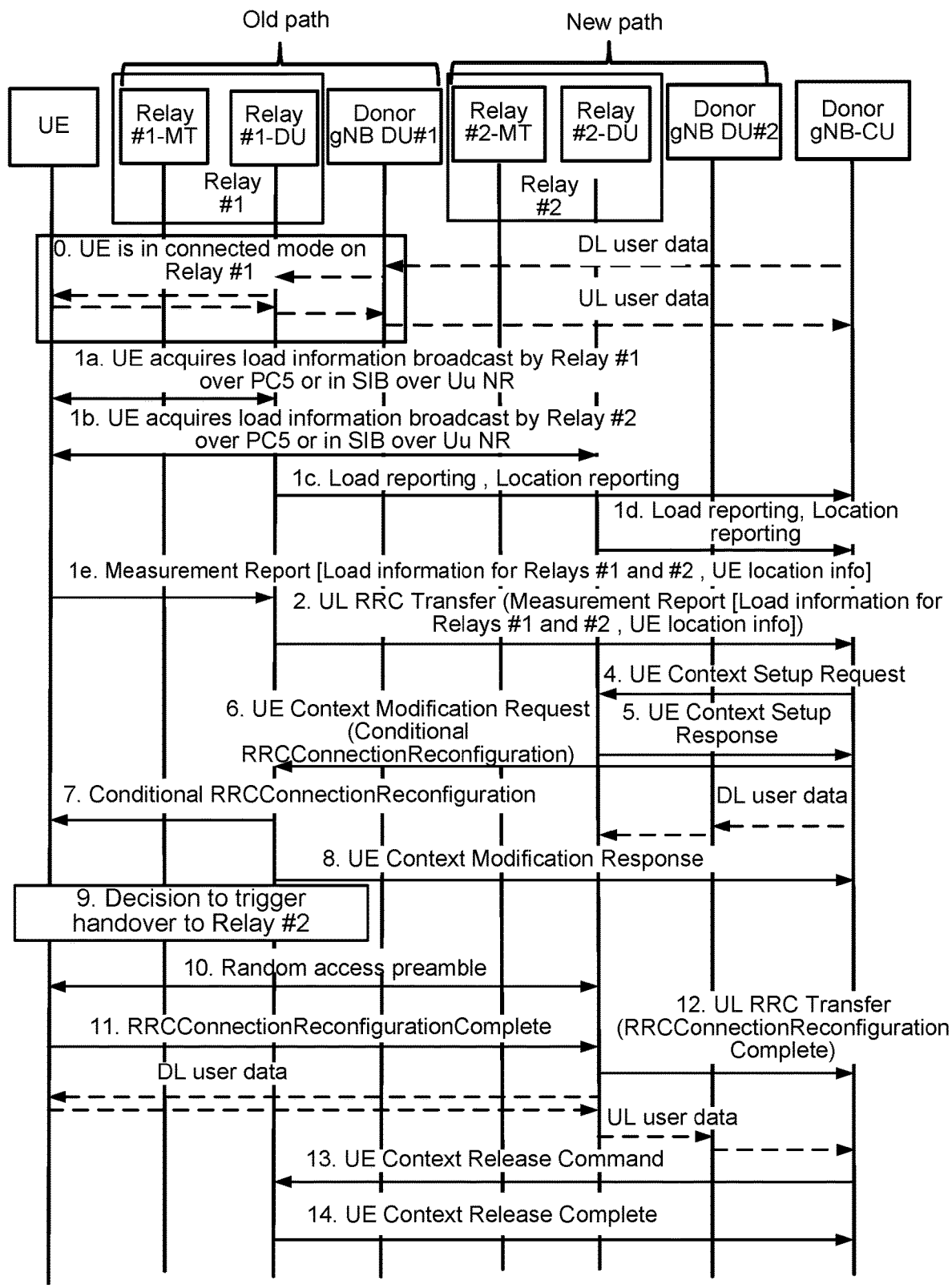

FIG. 12D illustrates another handover example. As shown in FIG. 12D, in steps 0-2, the steps 0 to 2 are the same as shown in FIG. 12A. In step 3, based on the criteria described in FIG. 12 Step 3, the Donor gNB decides to provide an RRC configuration to be used by the UE in case of handover to Relay #2. In steps 4-5, the steps 4-5 are the same as shown in FIG. 12A. In step 6, the Donor gNB provides the RRC configuration to be used by the UE in case of handover to Relay #2 to Relay #1. In step 7, Relay #1 provides the RRC configuration to be used by the UE in case of handover to Relay #2. In step 8, the step 8 is as shown in FIG. 12A. In step 9, the UE decides to trigger a handover to Relay #2, based on the criteria described in FIG. 12B Step 2. In steps 10-14, the steps 10 to 14 are performed as currently specified in existing 3GPP specifications.

Figure 13:
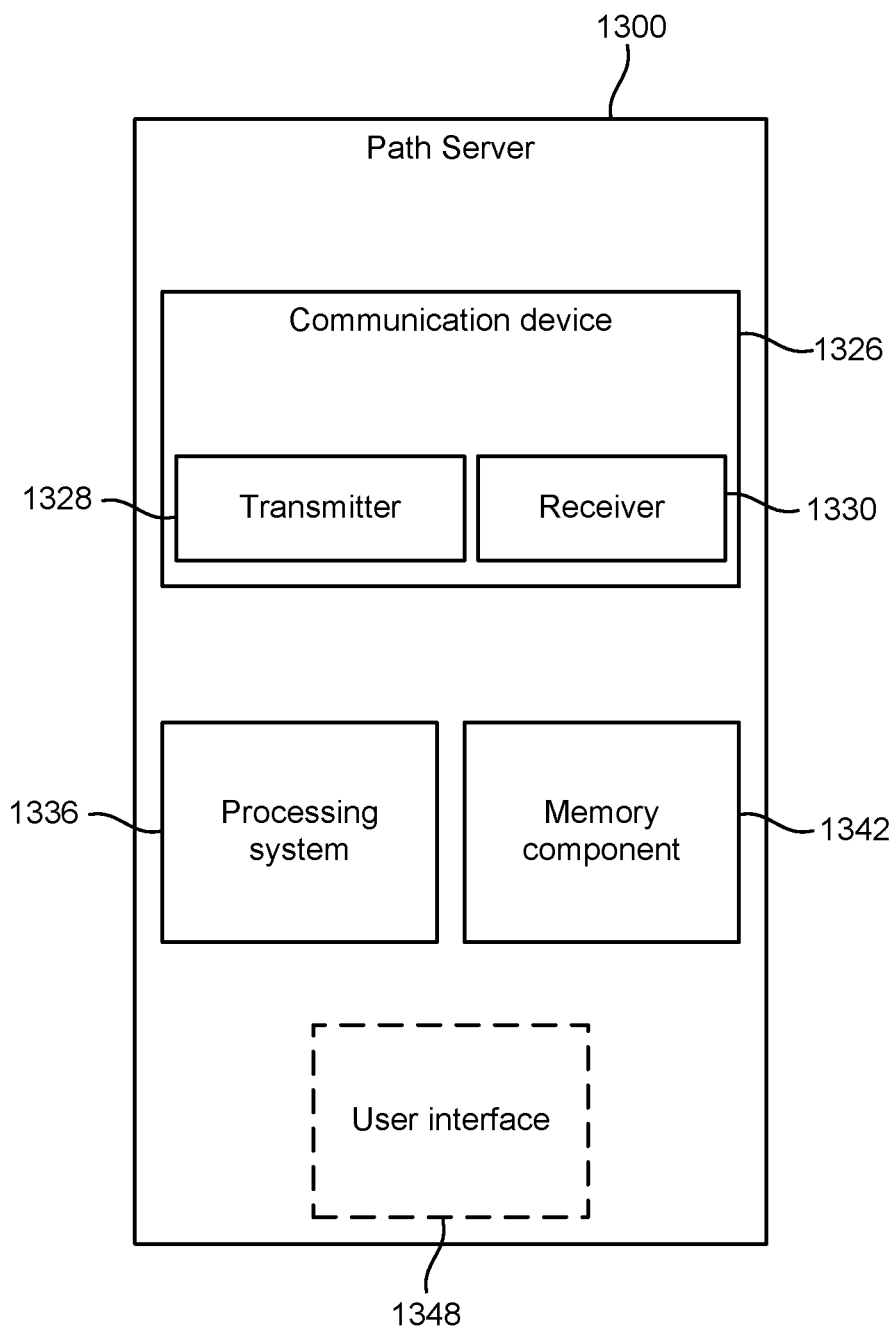
FIG. 13 illustrates a path server in accordance with aspects of the disclosure.

In some aspects disclosed herein the various functionalities disclosed may be implemented on any of a variety of commercially available server devices, such as server 1300 illustrated in FIG. 13. In an example, the server 1300 may correspond to one example configuration of the path server 750 described in the foregoing. Accordingly, in some examples, the path server 1300 includes at least one communication device (represented by the communication device 1326) for communicating with a network, such as a core network (such as NGC 210, EPC 260, etc.), a local area network coupled to other servers and/or to the Internet. For example, the communication device 1326 may include a network interface that is configured to communicate with one or more network entities via a wire-based or wireless backhaul. In some aspects, the communication device 1326 may be implemented as a transceiver configured to support wire-based or wireless signal communication. Accordingly, in the example of FIG. 13, the communication device 1326 is shown as comprising a transmitter 1328 and a receiver 1330. The various communications may involve, for example, sending and receiving: messages, data, instructions, parameters, or other types of information. In the various aspects disclosed, the path server is configured to communicate relay path information and relay cell lists, as discussed herein.

The path server 1300 includes a processing system 1336 and memory 1342 (such as each including at least one memory device). The memory 1342 may be volatile memory, a large capacity nonvolatile memory, such as a flash drive, solid state drive or disk drive or any combination thereof. In addition, path server 1300 may optionally include a user interface device 1348, for providing indications (such as audible and/or visual indications) to a user and/or for receiving user input (such as upon user actuation of a sensing device such as a keypad, a touch screen, a microphone, and so on). The various components illustrate in FIG. 13 may be configured according to the various examples described herein. It will be appreciated, however, that the illustrated blocks may have different functionality in different designs.

The components of FIG. 13 may be implemented in various ways. In some implementations, the components of FIG. 13 may be implemented in one or more circuits such as, for example, one or more processors and/or one or more ASICs (which may include one or more processors). Here, each circuit may use and/or incorporate at least one memory component for storing information or executable code used by the circuit to provide this functionality.

In addition, the modules, components and functions represented by FIGS. 5 and 11, as well as other modules, components and functions described herein, may be implemented using any suitable means. Such means also may be implemented, at least in part, using corresponding structure as taught herein. For example, the components described above in conjunction with the "module for" components also may correspond to similarly designated "means for" functionality. Thus, in some aspects one or more of such means may be implemented using one or more processors, memory, integrated circuits, or other suitable structure as taught herein, including as an algorithm. One skilled in the art will recognize in this disclosure an algorithm may be represented in the functions, actions, etc. described above, as well as in sequences of actions that may be represented by pseudo-code. For example, the components and functions represented in the Figures may include code for performing the functions, aspects and actions disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The methods, sequences and/or algorithms described in connection with the aspects disclosed herein may be incorporated directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a user terminal.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication, the method comprising:
    connecting a user equipment (UE) to a first relay, the first relay connected to a network node;
    receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node;
    determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; and
    connecting the UE to the second relay when the handover decision is determined to be positive.

2. The method of claim 1, wherein the relay information is received from one of the first relay or the second relay.

3. The method of claim 2, wherein the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest.

4. The method of claim 2, wherein the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest.

5. The method of claim 1, wherein the relay information is received from the UE or from the first relay by the network node and further comprises the UE location.

6. The method of claim 5, wherein the relay information is received from the UE by the network node periodically or based on a combination of one or more of the following occurrences: the signal strength information of the first relay falling below a strength threshold, the signal strength information of the second relay falling below a strength threshold, a velocity of the UE exceeding a velocity threshold, or the UE location entering or exiting an area of interest.

7. The method of claim 1, wherein the location information of the first relay comprises a current location and an expected path of the first relay, and the location information of the second relay comprises a current location and an expected path of the second relay.

8. The method of claim 7, wherein the current location of the first relay and the current location of the second relay are periodically received.

9. A user equipment (UE) comprising at least one processor, an antenna coupled to the at least one processor, and a memory coupled to the at least one processor, the at least one processor, antenna and memory being configured to perform a method, the method comprising:
    connecting the UE to a first relay, the first relay connected to a network node;
    receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node;
    determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; and connecting the UE to the second relay when the handover decision is determined to be positive.

10. The UE of claim 9, wherein the relay information is received from one of the first relay or the second relay.

11. The UE of claim 10, wherein the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest.

12. The UE of claim 10, wherein the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest.

13. The UE of claim 9, wherein the relay information is received from the UE or from the first relay by the network node and further comprises the UE location.

14. The UE of claim 13, wherein the relay information is received from the UE by the network node periodically or based on a combination of one or more of the following occurrences: the signal strength information of the first relay falling below a strength threshold, the signal strength information of the second relay falling below a strength threshold, a velocity of the UE exceeding a velocity threshold, or the UE location entering or exiting an area of interest.

15. The UE of claim 9, wherein the location information of the first relay comprises a current location and an expected path of the first relay, and the location information of the second relay comprises a current location and an expected path of the second relay.

16. The UE of claim 15, wherein the current location of the first relay and the current location of the second relay are periodically received.

17. A user equipment (UE) comprising means for performing a method, the method comprising:
connecting the UE to a first relay, the first relay connected to a network node;
receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node;
determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; and
connecting the UE to the second relay when the handover decision is determined to be positive.

18. The UE of claim 17, wherein the relay information is received from one of the first relay or the second relay.

19. The UE of claim 18, wherein the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest.

20. The UE of claim 18, wherein the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest.

21. The UE of claim 17, wherein the relay information is received from the UE or from the first relay by the network node and further comprises the UE location.

22. The UE of claim 21, wherein the relay information is received from the UE by the network node periodically or based on a combination of one or more of the following occurrences: the signal strength information of the first relay falling below a strength threshold, the signal strength information of the second relay falling below a strength threshold, a velocity of the UE exceeding a velocity threshold, or the UE location entering or exiting an area of interest.

23. The UE of claim 17, wherein the location information of the first relay comprises a current location and an expected path of the first relay, and the location information of the second relay comprises a current location and an expected path of the second relay.

24. The UE of claim 23, wherein the current location of the first relay and the current location of the second relay are periodically received.

25. A non-transitory computer-readable medium comprising at least one instruction for causing a computer or processor to perform a method, the method comprising:
connecting a user equipment (UE) to a first relay, the first relay connected to a network node;
receiving relay information by the network node or the UE, the relay information comprising location information of the first relay, signal strength information of the first relay, load information of the first relay, signal strength information of a second relay, load information of the second relay, location information of the second relay, wherein the second relay is connected to the network node;
determining, by the network node, whether a handover decision is positive or negative, wherein the handover decision is determined to be positive when a combination of one or more of the following is true: the signal strength information of the first relay is below a strength threshold, the load information of the first relay is above a load threshold, the signal strength information of the second relay is above the strength threshold, the load information of the second relay is below the load threshold, a UE location relative to path information of a first relay location and path information of a second relay location; and
connecting the UE to the second relay when the handover decision is determined to be positive.

26. The non-transitory computer-readable medium of claim 25, wherein the relay information is received from one of the first relay or the second relay.

27. The non-transitory computer-readable medium of claim 26, wherein the relay information of the first relay is received periodically or based on a combination of one or more of the following occurrences: the load information of the first relay exceeding the load threshold, the signal strength information of the first relay falling below the strength threshold, a velocity of the first relay exceeding a velocity threshold, or the first relay location entering or exiting an area of interest.

28. The non-transitory computer-readable medium of claim 26, wherein the relay information of the second relay is received periodically or based on a combination of one or more of the following occurrences: the load information of the second relay exceeding the load threshold, the signal strength information of the second relay falling below the strength threshold, a velocity of the second relay exceeding a velocity threshold, or the second relay location entering or exiting an area of interest.

29. The non-transitory computer-readable medium of claim 25, wherein the relay information is received from the UE or from the first relay by the network node and further comprises the UE location.

30. The non-transitory computer-readable medium of claim 25, wherein the location information of the first relay comprises a current location and an expected path of the first relay, and the location information of the second relay comprises a current location and an expected path of the second relay.

* * * * *